United States Patent
Hettel

(10) Patent No.: US 8,527,440 B2
(45) Date of Patent: Sep. 3, 2013

(54) SYSTEM AND APPARATUS FOR PERFORMING CONSISTENCY MAINTENANCE OF DISTRIBUTED GRAPH STRUCTURES THAT COMPARES CHANGES TO IDENTIFY A CONFLICTING OPERATION

(75) Inventor: Thomas Hettel, Schwetzingen (DE)

(73) Assignee: SAP AG, Walldorf (DE)

( * ) Notice: Subject to any disclaimer, the term of this patent is extended or adjusted under 35 U.S.C. 154(b) by 371 days.

(21) Appl. No.: 12/976,005

(22) Filed: Dec. 22, 2010

(65) Prior Publication Data

US 2012/0089542 A1     Apr. 12, 2012

Related U.S. Application Data

(60) Provisional application No. 61/392,273, filed on Oct. 12, 2010.

(51) Int. Cl.
*G06F 17/00* (2006.01)

(52) U.S. Cl.
USPC .......................................................... 706/45

(58) Field of Classification Search
USPC .......................................... 706/12, 45, 47, 62
See application file for complete search history.

(56) References Cited

U.S. PATENT DOCUMENTS

| 2011/0054652 A1* | 3/2011 | Heil | 700/98 |
| 2012/0016638 A1* | 1/2012 | McLean et al. | 703/1 |

OTHER PUBLICATIONS

C. Sun, Y. Zhang, X. Jia, and Y. Yang, "A Generic Operation Transformation Scheme for Consistency Maintenance in Real-time Cooperative Editing Systems," in Proceedings of the International ACM SIG-GROUP Conference on Supporting Group Work: The Integration Challenge, ACM, Nov. 16, 1997, Phoenix, Arizona, pp. 425-434.
C. Sun, X. Jia, Y. Zhang, Y. Yang, and D. Chen, "Achieving Convergence, Causality Preservation, and Intention Preservation in Real-time Cooperative Editing Systems," ACM Transactions on Computer-Human Interaction (TOCHI), col. 5, No. 1, Mar. 1998, pp. 63-108.
C. Sun and D. Chen, "Consistency Maintenance in Real-Time Collaborative Graphics Editing Systems," ACM Transactions on Computer-Human Interaction (TOCHI), vol. 9, No. 1, Mar. 2002, pp. 1-41.
D. Sun and C. Sun, "Context-based operational transformation in distributed collaborative editing systems," IEEE Transactions on Parallel and Distributed Systems, vol. 20, No. 10, Oct. 2009, pp. 1454-1470.

(Continued)

*Primary Examiner* — David Vincent
(74) *Attorney, Agent, or Firm* — Fish & Richardson P.C.

(57) ABSTRACT

The present disclosure is directed to systems and methods including retrieving a model including a plurality of objects and references between objects, receiving first user input indicating a set of first changes to the model, applying changes of the set of first changes to the model to provide a first modified model, receiving second user input indicating a set of second changes to the model, identifying a conflicting operation in the set of first changes to the set of second changes, applying one or more inverse operations to the first modified model to provide a second modified model, removing the conflicting operation from the set of first changes, defining a subset of first changes including the one or more changes after the conflicting operation, reconciling one or more changes to provide a reconciled subset of first changes, and defining an updated model.

17 Claims, 7 Drawing Sheets

(56) References Cited

OTHER PUBLICATIONS

C. Ignat and M. Norrie, "Customizable Collaborative Editor Relying on treeOPT Algorithm," in Proceedings of the Eighth conference on European Conference on Computer Supported Cooperative Works, Sep. 14-18, 2003, Helsinki, Finald pp. 315-334.

A. Davis, C. Sun, and J. Lu, "Generalizing Operational Transformation to the Standard General Markup Language," in Proceedings of the 2002 ACM Conference on Computer Supported Cooperative Week, Nov. 16-20, 2002, New Orleans, Louisiana, pp. 58-67.

D. A. Nichols, P. Curtis, M. Dixon, and J. Lamping, "High-latency, Law-bandwidth Windowing in the Jupiter Collaboration System," in UIST '95: Proceedings of the 8th Annual ACM Symposium on User Interface and Software Technology, ACM, 1995, New York City, New York, pp. 111-120.

S. Xia, D. Sun, C. Sun, D. Chen, and H. Shen, "Leveraging Single-user Applications for Multi-user Collaboration: the CoWord Approach," in CSCW '04: Proceedings of the 2004 ACM Conference on Computer Supported Cooperative Work, New York City, New York, Nov. 6-10, 2004, pp. 162-171.

D. Sun, S. Xia, C. Sun, and D. Chen, "Operational Transformation for Collaborative Word Processing," in Proceedings of the 2004 ACM Conference on Computer Supported Cooperative Work, CSCW'04, vol. 6, Issue 3, Nov. 6-10, 2004, pp. 437-446.

C. Ellis and C. Sun, "Operational Transformation in Real-Time Group Editors: Issues, Algorithms, and Achievements," in Proceedings of the 1998 ACM conference on Computer Supported Cooperative work, Nov. 14-18, 1998, pp. 59-68.

C. Sun, S. Xia, D. Sun, D. Chen, H. Shen, and W. Cai, "Transparent Adaptation of Single-User Applications for Multi-User Real-Time Collaboration," ACM Transactions on Computer-Human Interaction (TOCHI), vol. 13, No. 4, Dec. 2006, pp. 531-582.

C. Sun, "Undo as Concurrent Inverse in Group Editors," ACM Transactions on Computer-Human Interaction, vol. 9, No. 4, Dec. 2002, pp. 309-361.

J. Vogel, W. Geyer, L.-T. Cheng, and M. Muller, "Consistency Control for Synchronous and Asynchronous Collaboration Based on Shared Objects and Activities," Computer Supported Cooperative Work, vol. 13, No. 5-6, 2004, pp. 573-602.

* cited by examiner

SYSTEM AND APPARATUS FOR PERFORMING CONSISTENCY MAINTENANCE OF DISTRIBUTED GRAPH STRUCTURES THAT COMPARES CHANGES TO IDENTIFY A CONFLICTING OPERATION

CROSS-REFERENCE TO RELATED APPLICATIONS

This application claims priority to U.S. Provisional App. No. 61/392,273 filed on Oct. 12, 2010, the disclosure of which is expressly incorporated herein by reference in its entirety.

BACKGROUND

Real-time collaboration can allow remote participants to concurrently manipulate the same document and immediately see the other participant's changes without locking parts of the document or having to merge different versions. This can provide an improved user experience.

SUMMARY

In order to provide real-time collaboration to a wide range of applications in a flexible, domain independent and scalable way, the disclosed procedures work on a graph structure, which can be interpreted, for example, as (but not limited to) Business Process Model and Notation (BPMN) or Unified Modeling Language (UML) models, tables, text documents. Initially, identical copies of the graph structure are replicated at each participant's site. A small number of primitive operations can be used to manipulate this structure. As graphical editors manipulating the graph structure can perform complex and domain-specific operations, primitive operations can be grouped into complex operations, which can be exchanged by the participants to update their respective copies of the graph structure. To account for concurrent changes, these operations may need to be transformed against other concurrently performed operations. The transformation may be solely applied to the generic primitive operations and thus may be domain independent. This can allow the disclosed procedures to be reused for any application whose data can be mapped to a graph structure.

Implementations of the present disclosure include methods for synchronizing distributed graph structures representing application data. These methods can be independent from the actual application domain and can be reused for any application whose data can be mapped to a graph. In some implementations, methods include retrieving, at a computing device, the data structure from computer-readable memory, the data structure comprising a model including a plurality of objects and references between objects, receiving, at the computing device, first user input indicating a set of first changes to the model, each change in the set of first changes comprising one or more primitive operations, each primitive operation being executable to modify the model, applying changes of the set of first changes to the model to provide a first modified model, receiving, at the computing device, second user input indicating a set of second changes to the model, each change in the set of second changes comprising one or more primitive operations, each primitive operation being executable to modify the model, comparing the set of first changes to the set of second changes to identify a conflicting operation, applying one or more inverse operations to the first modified model to provide a second modified model, the one or more inverse operations corresponding to the conflicting operation and to one or more changes occurring after the conflicting operation, removing the conflicting operation from the set of first changes, defining a subset of first changes, the subset of first changes comprising the one or more changes occurring after the conflicting operation, reconciling one or more changes in the subset of first changes based on removal of the conflicting operation to provide a reconciled subset of first changes, defining an updated model by applying changes of the reconciled subset of first changes to the second modified model, and storing the updated model in computer-readable memory.

In some implementations, methods further include accessing one or more operational transformations stored in computer-readable memory, each transformation specifying how one primitive operation is transformed against another primitive operation, wherein comparing the set of first changes to the set of second changes is performed based on the one or more operational transformations.

In some implementations, the conflicting operation corresponds to an exclusive operational transformation, in which an operation of a change in the set of first changes conflicts with an operation of a change in the set of second changes.

In some implementations, reconciling one or more changes in the subset of first changes based on removal of the conflicting operation to provide a reconciled subset of first changes includes: accessing one or more operational transformations stored in computer-readable memory, each transformation specifying how one primitive operation is transformed against another primitive operation, and transforming the one or more changes in the subset of first changes based on the one or more operational transformations to account for absence of the conflicting operation.

In some implementations, defining an updated model further includes applying one or more changes of the set of second changes.

In some implementations, the set of second changes is generated at a first time and the set of first changes is generated as a second time, the second time being later than the first time.

In some implementations, applying one or more inverse operations includes: accessing an execution log comprising a sequence of operational transformations that have been applied to the model, determining a reverse sequence based on the sequence, and applying one or more inverse operations in the reverse sequence.

In some implementations, each change in the subset of first changes is affected by the conflicting operation.

In some implementations, the set of first changes includes a change.

In some implementations, the set of first changes includes a plurality of changes.

In some implementations, the set of second changes includes a change.

In some implementations, the set of second changes includes a plurality of changes.

In some implementations, the second user input is generated at a remote computing device and is transmitted to the computing device over a network.

In some implementations, the first user input is provided by a first user and the second user input is provided by a second user different from the first user.

In some implementations, the conflicting operation is a complex operation including a plurality of primitive operations.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
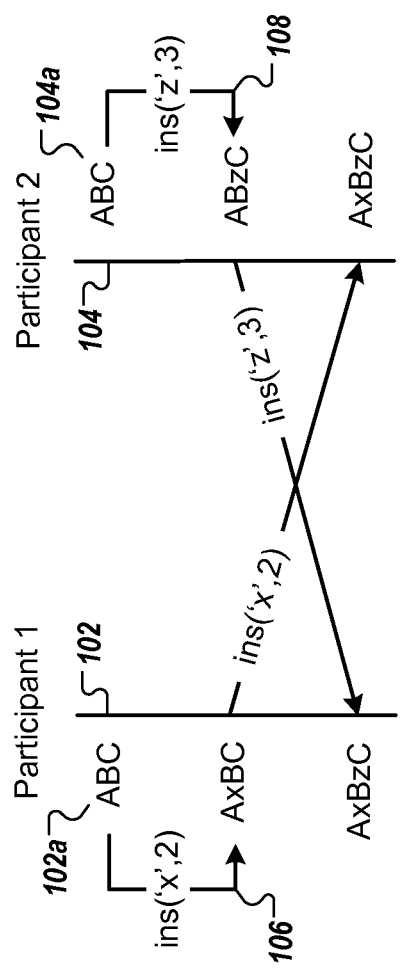
FIG. 1 is a diagram of an example of two participants manipulating a shared distributed document.

FIG. 1 is a diagram of an example of two participants, a first participant 102 and a second participant 104 manipulating a shared distributed document. In the example of FIG. 1, operational transformations can be used to facilitate the collaborative editing of the shared distributed document. As shown in FIG. 1, initially both the first participant 102 and the second participant 104 have identical copies of a document (first document 102a and second document 104a). The document includes the string "ABC" in the first three positions in the document. Each document 102a, 104a is then subject to concurrent operations 106, 108 by the first participant 102 and the second participant 104, respectively. For example, the first participant 102 one inserts "x" at position two in the document (insertion 106) leading to the string "AxBC". Concurrently, the second participant 104 inserts "z" at position three in the document (insertion 108) leading to the string "ABzC".

In some implementations, the first participant 102 and the second participant 104 can exchange the operations they have performed on their respective copy of the document, such that the other participant can also change their version of the document accordingly. However, each participant cannot apply the other's operation to their local document as the position for insertion of the character is changed once each participant inserts their character into the string. For example, if the first participant 102 inserted the changes of the second participant 104 into their copy of the document, the document would then include the string "AxzBC". If the second participant 104 inserted the changes of the first participant 102 into their copy of the document, the document would then include the string "AxBzC". At this stage, the documents have diverged and are not synchronized. In order to synchronize the copies of the document, the first participant 102 can transform the operation of the second participant 104 against the changes made to the document by the first participant 102. In doing so, the first participant 102 can adjust the position at which the new character ('x') is inserted. Since the first participant 102 inserted the character 'x' at position two in the string "ABC", the first participant 102 now has to insert the character 'z' at position four rather than position three in the string "ABC" in order to synchronize the changes to the string. This process can be referred to as an operational transformation (OT).

OT techniques can be applied to text as well as to data structures (e.g., Hypertext Markup Language (HTML) and XML) and tree structures. OT techniques can be used for synchronizing word processing documents in an application independent way. For example, trees can be used as approximations of software models. The force-fitting of the software model into a tree structure can result in dangling references across sub-trees. This can result in the generation of a corrupted software model. In some implementations, a graph can be used as an approximation of a software model where the graph includes different versions of nodes in order to handle conflicts. In some cases, ordered references as well as collaborative editing of an attribute of the software model (e.g., a text field documenting a specific node) may not be supported without applying an OT to the graph.

Control algorithms can determine what operations being performed in the collaborative editing of a distributed document are concurrent and therefore can be transformed. In some implementations, the control algorithms may not be tied to the underlying data structure of the document or the operations performed and therefore can be reused. In some implementations, the complexity of the control algorithms can cause the data structures to diverge. In such cases, a modified control algorithm can consider operation contexts as opposed to causal dependencies when determining what operations are concurrent. The modified control algorithm may work with inclusive transformations. In some cases, the modified control algorithm may not work with exclusive transformations, which can be more relevant when using a graph as approximation of a software model.

For example, when using a graph as an approximation of a software model, a graphical editor for manipulating the software model (e.g. UML, BPMN) can involve the use of fifteen to twenty different operations. In some cases, for example, approximately 225 to 400 different combinations of operations may be considered when implementing an OT. In addition, proof of convergence of the 225 to 400 different combinations of operations can be included when implementing an OT. The complexity of each proof of convergence can be increased dependent on the complexity of the associated operation or the underlying data structure. In addition, if a single operation is added (e.g., an increase from twenty operations to twenty-one operations), an additional forty-one combinations may have to be considered for the transformation along with the proof of convergence for each operation. Due to the large number of operations, in some cases, the OT can be prone to errors (e.g., implementation errors).

Figure 2:
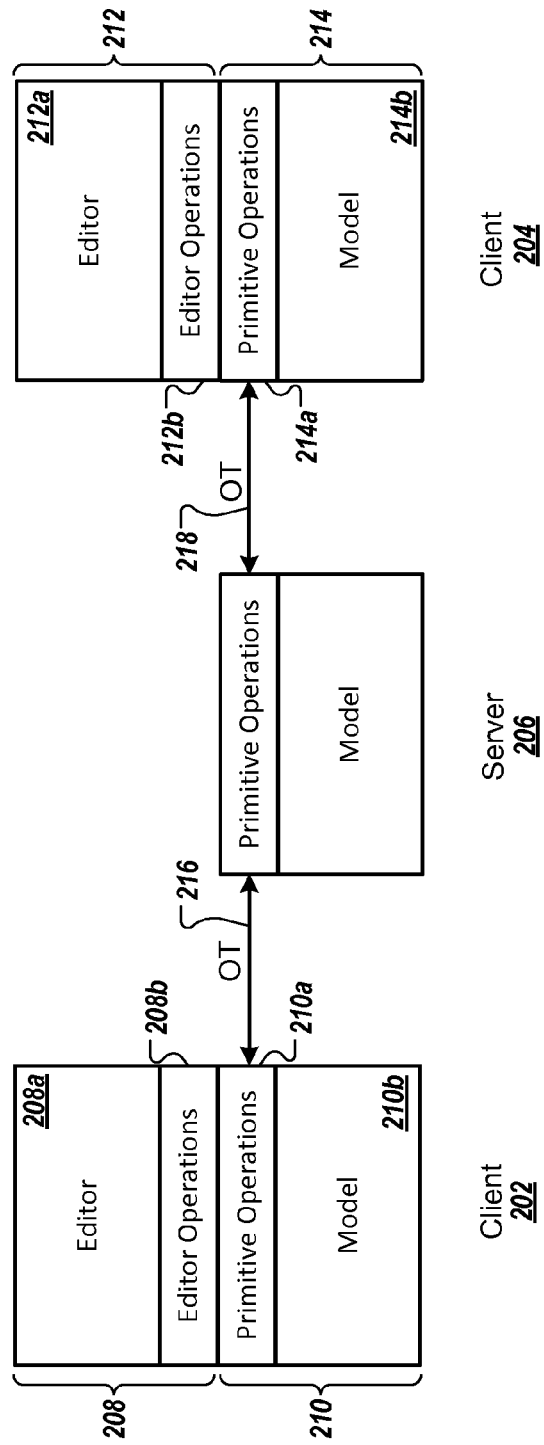
FIG. 2 is a block diagram of a generic platform for a collaborative modeling system that handles maintenance of graph structures.

FIG. 2 is a block diagram of a generic platform 200 for a collaborative modeling system that handles maintenance of graph structures. For example, the platform 200 is a client-server architecture that includes clients 202, 204 and server 206. The server 206 can be independent from the application running on the clients 202, 204. First client 202 can include an application specific component 208 that includes editor 208a and editor operations 208b built on top of a graph structure 210 for a software model 210b that includes primitive operations. Similarly, second client 204 can include an application specific component 212 that includes editor 212a and editor operations 212b built on top of a graph structure 214 for a software model 214b that includes primitive operations 214a. For first client 202, operations in the application specific component (e.g., editor operations 208b) and the primitive operations (e.g., primitive operations 210a) can be combined into application specific complex operations. Similarly, for second client 204, operations in the application specific component (e.g., editor operations 212b) and the primitive operations (e.g., primitive operations 214a) can be combined into application specific complex operations. The server 206, the client 210 and the client 214 can perform operational transformations (e.g., OT 216 and OT 218) at the level of the primitive operations 210a, 214a, respectively.

The example collaborative modeling system shown in FIG. 2 can provide for the synchronization of a graphical editor and its operations (e.g., editor 208a and editor operations 208b) with an underlying document or data structure (e.g., the model 210b). Primitive operations 210a can be used to manipulate the data structure (e.g., the model 210b). A model (e.g., model 210b) can include of a set of objects (e.g., nodes in a graph) and references between objects (e.g., named edges on the graph). In some implementations, the model is classless as it does not refer to any class or type information. In some implementations, the model can include class information by introducing objects as tuples consisting of a unique object identifier and an identifier of the most specific class to which the object adheres in order to achieve a more operations framework approach to the modeling. In addition, reference assignments can be functional relations that map objects and reference names to lists of objects where sequences, for example, may be restricted to ordered sets. Objects can have attributes, which are functions mapping an object to a value of a primitive type (e.g., a string, an integer, a real, or a Boolean).

The following is an example of a definition of a model (e.g., model 210b, model 214b). Let id={obj1, obj2, ... } be an infinite set of object identifiers, let T={String, Integer, String, Boolean} be the set of primitive types and I(·) their usual interpretation, where I(Boolean)={true, false}, I(Integer)=Z, I(Real)=R and I(String) are possibly empty sequences over some characters. Let Value=$I$(Boolean)∪$I$(Integer)∪$I$(Real)∪$I$(String)∪{⊥} be the set of values assignable to attributes including ⊥ which denotes an unassigned value. Let Name be an infinite set of names that identify an object's attributes or references, r.

A model M is a tuple (O, A, R), with the following relations: O ⊂ id is the set of objects in the model, A: id×Name→Value is the total function that maps objects and attribute names to value assignments where A(o, a)=v such that o ∈ O ∧ v ∈ Value. For example, v is the value of the attribute a of object o. If no value is assigned, ⊥ (an unassigned value) is returned. In addition, R: id×Name→ (id× ... × id) is the set of reference assignments where R(o, r)=$\bar{o}$ and $\bar{o}$=o1, ..., on (n≧0). For example, $\bar{o}$ is the list of objects referred to from object o by reference The following notational conventions can be used in the subsequent description. Non-italicized characters are used to denote constants and names, and variables are italicized. In formal expressions covering a number of objects, the italicized characters: m, n, o, p and q will be used to denote objects. The use of $\bar{o}$ ($\bar{m}$, and $\bar{n}$) can represent sequences of objects $o_1, \ldots, o_n$ and o ∈ $\bar{o}$ if o is an element in sequence $\bar{o}$. Similarly, u, v, w, x can represent values. Switching can occur between functional and relational notation for attribute assignments and references (e.g., (o, r, $\bar{o}$) ∈ R in place of R(o, r)=$\bar{o}$ or vice versa, depending on what is more convenient).

Figure 3:
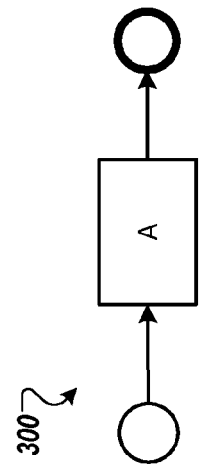
FIG. 3 is a block diagram of an example model data structure.

FIG. 3 is a block diagram of an example model data structure 300. The model data structure 300 can be represented using the model tuple (O, A, R) as described in FIG. 2.
O={$obj_1$, $obj_2$, $obj_3$, $obj_4$, $obj_5$}
A={($obj_1$, type, "PlainStartEvent"), ($obj_2$, type, "SequenceFlow"), ($obj_3$, type, "Activity"), ($obj_4$, type, "SequenceFlow"), ($obj_5$, type, "PlainEndEvent"), ($obj_2$, name, "A")}
R={($obj_4$, src, ($obj_1$)), ($obj_4$, tgt, ($obj_2$)), ($obj_1$, srcOf, ($obj_4$)), ($obj_2$, tgtOf, ($obj_4$)), ($obj_5$, src, ($obj_2$)), ($obj_5$, tgt, ($obj_3$)), ($obj_2$, srcOf, ($obj_5$)), ($obj_3$, tgtOf, ($obj_5$))}

Based on the definition of a model, a set of primitive operations can be defined to manipulate the different components of the model. The primitive operations can enable a user to add objects to and delete objects from the model. In addition, the primitive operations can allow the user to manipulate references between objects in the model. The primitive operations can allow the user to set new values for attributes.

For example, manipulating a reference between objects in the model can involve different semantics based on the cardinality of the reference. For example, if the cardinality of the reference is one, the reference may behave more like an attribute, where setting a new value replaces a previous value. References with a cardinality of one can be manipulated using the function: setRef( ). In another example, if the cardinality of the reference is many, adding a referenced object inserts the object into a sequence, and does not replace another object in the sequence. References with a cardinality of many are manipulated using the functions: addRef( ) or delRef( ) to add a referenced object into a sequence or delete a referenced object from a sequence, respectively.

In some implementations, in order to reduce the complexity of primitive operations, an object may be deleted from a model if there are n o references from the object and to the object, and all attributes for the object are set to ⊥ (the attributes have no assigned value). In some implementations, primitive operations performed on models can be defined in terms of their pre-conditions and their post-conditions.

For example, the function ω is a primitive operation, such that ω(M)=M' with M=(O, A, R) and M'=(O', A', R'). Examples of primitive operations can include, but are not limited to, the following operations.

The primitive operation addObj(o) adds a new object o to model M. For each object, a universal unique identifier can be chosen in order to guarantee that different objects created by different participants do not happen to have the same object identifier.

pre: $o \notin O$
post: $O'=O \cup \{o\} \land R'=R \land A'=A$

The primitive operation delObj(o) removes an object o from model M. This operation can be used if there are no references from and to o and all of o's attributes are set to $\bot$.

pre: $o \in O \land (o,r,\bar{o}) \in I_R \not\exists \not\exists (p,r,\bar{o}) \in R : o \in \bar{o}) \land (\forall (o,a,v) \in A : v = \bot)$
post: $O'=O \setminus \{o\} \land R'=R \land A'=A$ The primitive operation addRef(o, r, p, i) adds a reference r from o to p to the model M. This operation can be used if o and p are part of the model, p is not already referenced by r from o and index i is within the bounds.

pre: $o,p \in O \land p \notin \bar{o} = R(o,r) \land \bar{o} = o_1, \ldots o_n \land 1 \leq i \leq n+1$
post: $O'=O \land R'=R \setminus \{(o,r,\bar{o})\} \cup \{(o,r,(o_1, \ldots, o_{i-1}, p, o_i, \ldots, o_n))\} \land A'=A$ The primitive operation delRef(o, r, p, i) deletes a reference r from o to p from the model M. This operation can be used if p is referenced by r from o at index i and r's cardinality is many.

pre: $o,p \in O \land R(o,r) = \bar{o} = o_1, \ldots, o_{i-1}, p, o_{i+1}, \ldots, o_n$
post: $O'=O \land R'=(R \setminus \{(o,r,\bar{o})\}) \cup \{(o,r,(o_1, \ldots, o_{i-1}, o_{i+1}, \ldots, o_n))\} \land A'=A$ The primitive operation setRef(o, r, p, q) sets a unary reference r from o to q replacing p. This operation can be used if o currently references p by r, q is part of the model and r has cardinality of one.

pre: $o,p,q \in O \land R(o,r) = p$
post: $O'=O \land R'=(R \setminus \{(o,r,p)\}) \cup \{(o, r, q)\} \land A'=A$ The primitive operation upd(o, a, v, w) replaces the attribute value v assigned to a of object o with the new value w. This operation can be used if o's attribute a is currently assigned to v.

pre: $o \in O \land A(o,a) = v$
post: $O'=O \land A'=(A \setminus \{(o,a,v)\}) \cup \{(o,a,w)\} \land R'=R$ id( ) is the identical operation, which does nothing.

pre: true
post: $O'=O \land A'=A \land R'=R$

In some implementations, primitive operations may include one or more additional parameters used for performing the operation. For example, when setting a new attribute value, the old attribute value may not be known. The parameters can ensure that the set of primitive operations is closed under the inverse. For example, the addition of a new object to a sequence can be inversed by deleting the object from the sequence and the deletion of an object from a sequence can be, inversed by adding the object back into the sequence. In another example, the addition of a new reference can be inversed by deleting the reference and the deletion of a reference can be inversed by adding the reference back. For example, updating attributes or setting references can be inversed by swapping the new values with the old values. In addition, the identity operation can be its own inverse. The ability to define the inverse of an operation can prove beneficial when undoing changes made to a model in order to handle exclusive transformations.

For example, let $\omega$ be a primitive operation, then $\bar{\omega}$ is its inverse such that $\bar{\omega} \circ \omega = \omega \circ \bar{\omega} = id$. Examples of inverse operations can include, but are not limited to, the following operations.

$\overline{addObj(o)} = delObj(o)$
$\overline{delObj(o)} = addObj(o)$
$\overline{addRef(o,r,p,i)} = delRef(o, r, p, i)$
$\overline{delRef(o,r,p,i)} = addRef(o, r, p, i)$
$\overline{setRef(o,r,p,q)} = setRef(o, r, q, p)$
$\overline{upd(o,a,v,w)} = upd(o, a, w, v)$
$\overline{id(\square)} = id( )$ Referring to FIG. 2, when manipulating a model (e.g., model 210b) through a graphical editor (e.g., editor 208a), one or more primitive operations can be performed on the model in sequence. For example, when adding a new activity a, a new object is created and its type attribute is set to "Activity", its name attribute is set to "new Activity" and a reference pointing from the model m to the activity a is created. For example, addAct(a,m)=addRef(m,elements,a,0)∘upd(a,name,$\bot$, "newActivity")∘upd(a,type,$\bot$,"Activity")∘addObj(a).

The sequence of primitive operations can form a complex operation that can be dependent on the actual domain used for the model (e.g., BPMN, UML). A complex operation, $\Omega$, is a sequence of primitive operations $\omega_1, \ldots, \omega_n$ where $\Omega = \omega_n \circ \ldots \circ \omega_1$. For notational convenience, we can represent the complex operation as: $\Omega = \omega_1, \ldots, \omega_n$.

The inverse of a complex operation is the inverse of the sequence of primitive operations that formed the complex operation performed in reverse order. For the complex operation $\Omega = \omega_1, \ldots, \omega_n$, the inverse of the complex operation, $\bar{\Omega}$, can be $\bar{\Omega} = \bar{\omega}_n, \ldots, \bar{\omega}_1$ such that $\bar{\Omega} \circ \Omega = id( )$.

In some implementations, complex operations can group together one or more primitive operations. In some implementations, one or more states of a model can be reached when using a graphical editor running stand-alone (without collaboration). A sequence of complex operations can characterize the one or more states where additional in-between states may not be reached. The sequence of complex operations can encode model constraints or semantics and are exposed to the user as a single operation. Therefore, it may be desirable to ensure that the primitive operations of two concurrent complex operations do not interact in such a way that a state of the model can be reached which may not otherwise be produced by performing complex operations locally, without interference.

As described with reference to FIG. 1, operations of other participants may be seen in the light of one's own changes. A participant can transform another participant's operations against his or her own operations. For example, a collaborative modeling system (as shown in FIG. 2) can use one of two types of operational transformations, either an inclusive transformation (IT) or an exclusive transformation (ET). An inclusive transformation can transform two operations, $\omega_a$, $\omega_b$, such that the resulting operation, $\omega'$, includes the effects of both $\omega_a$ and $\omega_b$. For example, FIG. 1 describes an inclusive transformation. When using an inclusive transformation, the resulting document includes all of the concurrently inserted characters. The inclusive transformation may not exclude one character in favor of another character. For an inclusive transformation to produce converging documents, the order in which the operations are transformed and applied are noted. As a notational convention, $\omega'$ denotes the transformed version of $\omega$.

For example, an inclusive transformation is a function $IT(\omega_a, \omega_b) = \omega'$ where $\omega_a$ is translated against $\omega_b$ resulting in $\omega'_a$. In addition, for all $\omega_a, \omega_b, \omega'_b \circ \omega_a = \omega'_a \circ \omega_b$ where $\omega'_a = IT(\omega_a, \omega_b)$, and $\omega'_b = IT(\omega_b, \omega_a)$.

In some implementation, an inclusive transformation may not be feasible. In some implementations, an exclusive transformation can be performed where the effects of one operation are excluded by another operation. For example, referring to FIG. 2, consider two concurrent operations, $\omega_1$ and $\omega_2$, performed by a first client and a second client, respectively. The first operation, $\omega_1$, moves Activity A in one direction and the second operation, $\omega_2$, moves the Activity A to a different position. In this example, transforming one operation against another, at the same time, may not preserve the intention of each client 202, 204. Therefore, the models in both clients (e.g., model 210b and model 214b) may diverge. In some implementations, additional efforts may bring the models (e.g., model 210b and model 214b) into synchronization. In some cases, an exclusive transformation may not produce any transformed operation. If performing the two concurrent operations does not pose a conflict, an exclusive transformation can perform in a similar manner as an inclusive transformation. In case there is a conflict, the transformation returns $\perp$, and in doing so it can be symmetric, such that if $\omega_a$ is in conflict with $\omega_b$ then $\omega_b$ is in conflict with $\omega_a$ and both cases can result in $\perp$.

the cells in the table that include $X_i$ may be subject to operational transformations that are more complex. If an operational transformation is not possible, $\perp$ (an unassigned value) is returned. For example, this may occur when the addition of a reference between two objects is transformed against the deletion of one of the objects participating in the reference. In order to delete an object, there may not be any references from the object or to the object, and all attribute values are set to $\perp$. Therefore, translating the deletion of an object against updating its attribute value to anything other than $\perp$ may fail. Alternatively, id( ) is returned if, for example, the addition of an object is transformed against the addition of the very same object, since an object can be added once.

TABLE 1

|  | addObj(o) | delObj(p) | addRef(o,r,q,i) | delRef(o,r,q,i) | setRef(o,r,.,i) | upd(o,a,u,v) |
|---|---|---|---|---|---|---|
| addObj(p) | id( ), if p=o addObj(p) | $\perp$, if p=o addObj(p) | addObj(p) | addObj(p) | addObj(p) | addObj(p) |
| delObj(p) | $\perp$, if p=o delObj(p) | id( ), if p=o delObj(p) | $\perp$, if p=o V p=q delObj(p) | delObj(p) | $\perp$, if (p=o $\wedge$ q$\neq\perp$)Vp=q delObj(p) | $\perp$, if p=o $\wedge$ v$\neq\perp$) delObj(p) |
| addRef(p,s,n,j) | addRef(p,s,n,j) | $\perp$, if p=o V n=o addRef(p,s,n,j) | $X_1$ | $X_2$ | addRef(p,s,n,j) | addRef(p,s,n,j) |
| delRef(p,s,n,j) | delRef(p,s,n,j) | id( ), if p=o delRef(p,s,n,j) | $X_3$ | $X_4$ | delRef(p,s,n,j) | delRef(p,s,n,j) |
| setRef(p,s,m,n) | setRef(p,s,m,n) | $\perp$, if (p=o $\wedge$ n$\neq\perp$)Vn=o id( ),if (p=o $\wedge$ n=$\perp$) setRef(p,s,m,n) | setRef(p,s,m,n) | setRef(p,s,m,n) | $X_5$ | setRef(p,s,m,n) |
| upd(p,b,w,x) | upd(p,b,w,x) | $\perp$, if p=o $\wedge$ x$\neq\perp$ id( ), if p=o $\wedge$ x=$\perp$ upd(p,b,w,x) | upd(p,b,w,x) | upd(p,b,w,x) | upd(p,b,w,x) | $X_6$ |

For example, an exclusive transformation is a function $ET(\omega_a, \omega_b)=\omega'_a$, where $\omega_a$ is translated against $\omega_b$ resulting in $\omega'_a$. In addition, for all $\omega_a$, $\omega_b$ either $\omega'_b\circ\omega_a=\omega'_a\circ\omega_b$ if and only if $\omega'_a\neq\perp \wedge \omega'_b\neq\perp$, or $\omega'_a=\perp$ if and only if $\omega'_b=\perp$, where $\omega'_a=ET(\omega_a, \omega_b)$, and $\omega'_b=ET(o)\omega_b, \omega_a)$. In some implementation, an inclusive transformation can also be an exclusive transformation (e.g., a transformation that may not return $\perp$) but not vice versa.

As described, a set of sequential primitive operations can define operational transformations for models. For example, referring to Table 1, an operational transformation $T(\omega_a, \omega_b)=\omega'_a$ is defined, where $\omega_a$ is transformed against $\omega_b$. In Table 1, $\omega_a$ are listed on the left hand side, and $\omega_b$ are listed at the top. There can be a number of non-obvious considerations in the definition of the operational transformation shown in the transformation matrix of Table 1. In one example, a consistency property, $\omega'_b\circ\omega_a=\omega'_a\circ\omega_b$, may be guaranteed for cases that do not result in $\perp$ (an unassigned value). For cases where there are conflicts, which can be symmetric, the problem of the conflict may be escalated and dealt with using a control algorithm, which will be described with reference to FIGS. 4, 5, and 6. In another example, the operational transformation may not be completely inclusive or completely exclusive but a combination of both.

In some implementations, the operational transformation can be simple and directly included in a table. For example, In some implementations, the transformation of operations that manipulate references can be a complex task. Similar to the example described in FIG. 1, the position at which an object is referenced is subject to transformation. For example, referring to Table 1, when transforming the addition of a reference against another addition of a reference (addRef( ) operation against addRef( )operation) different cases can be considered and are shown in the equation for $X_1$ below. For example, if all parameters of both operations are the same, id( ) is returned, as the reference has already been added and can be added once. For example, if all parameters of both operations are the same, but the index where to insert the object is different, $\perp$ is returned as this constitutes a collision. However, if the requirement for the references to be sets is dropped, a collision would not occur and the referenced object could be added at different positions. In some cases, another way to remove the collision conflict is to change the semantics of addRef( ) in such a way that allows a referenced object to be moved to another index if it was added twice. For example, if different objects are inserted into the same reference, and the index of the first operation is greater than the index of the second operation, the first operation is returned with an incremented index. For example, if different objects are inserted into the same reference and the indexes are the same and object n is greater than object q (with respect to some total order), then the index of the first operation is incremented. In another example, the first operation is returned which covers the cases where the index of the first operation is less than the index of the second operation.

$$X_1 = T(addRef(p, s, n, j), addRef(o, r, q, i))$$
$$= \begin{cases} id() & \text{if } p = o \wedge s = r \wedge n = q \wedge j = i \\ \bot & \text{if } p = o \wedge s = r \wedge n = q \wedge j \neq i \\ addRef(p, s, n, j+1) & \text{if } p = o \wedge s = r \wedge n \neq q \wedge j > i \\ addRef(p, s, n, j+1) & \text{if } p = o \wedge s = r \wedge n \neq q \wedge j = i \wedge |n| > |q| \\ addRef(p, s, n, j) & \text{otherwise} \end{cases}$$

For example, referring to Table 1, when transforming the addition of a reference against the deletion of a reference (addRef( ) operation against delRef( ) operation) different cases can be considered and are shown in the equations for $X_2$ and $X_3$ below. For example, indexes can be adjusted if objects from the same reference are manipulated. For example, referring to Table 1, when transforming the addition of a reference against another addition of a reference (addRef( ) operation against addRef( )operation) different cases can be considered and are shown in the equation for $X_1$ below. For example, if a referenced object is removed at an index before the index at which a referenced object is to be inserted, the index of the insertion can be decremented. In another example, if a referenced object is removed at an index after the index at which a referenced object is to be inserted, the first operation (addRef ( )) is returned without any changes. For example, if the same object is deleted and added at the same time, a conflict can occur. This example may not occur as one of the operations would violate its precondition. For example, the reference can be removed if it was previously added, and it can be added if it is not already there.

$$X_2 = T(addRef(p, s, n, j), delRef(o, r, q, i))$$
$$= \begin{cases} addRef(p, s, n, j-1) & \text{if } p = o \wedge s = r \wedge n \neq q \wedge j > i \\ \bot & \text{if } p = o \wedge s = r \wedge n = q \\ addRef(q, s, n, j) & \text{otherwise} \end{cases}$$

$$X_3 = T(delRef(p, s, n, j), addRef(o, r, q, i))$$
$$= \begin{cases} delRef(p, s, n, j+1) & \text{if } p = o \wedge s = r \wedge n \neq q \wedge j \geq i \\ \bot & \text{if } p = o \wedge s = r \wedge n = q \\ delRef(p, s, n, j) & \text{otherwise} \end{cases}$$

For example, referring to Table 1, when transforming the deletion of a reference against the deletion of a reference (delRef( ) operation against delRef( ) operation) different cases can be considered and are shown in the equation for $X_4$ below. For example, if the same reference is manipulated, indexes can be adjusted. In another example, if the parameters of both operations are the same, the identical operation id( ) is returned, as a reference can be removed just once. For all other cases, the original operation is returned.

$$X_4 = T(delRef(p, s, n, j), delRef(o, r, q, i))$$
$$= \begin{cases} delRef(p, s, n, j-1) & \text{if } p = o \wedge s = r \wedge n \neq q \wedge j > i \\ id() & \text{if } p = o \wedge s = r \wedge n = q \\ delRef(q, s, n, j) & \text{otherwise} \end{cases}$$

Unary references and attributes can behave in a similar. For example, if both operations set the same values of the same object's attribute, id( ) is returned, as the values of the object's attribute can be set just once. In another example, if the operations set the same attribute or reference to different values or objects, a collision occurs and $\bot$ (an unassigned value) is returned. Therefore, once a complex operation is applied, all attributes and references are set as specified. If the setting of all attributes and references as specified is not a concern, then one value can override another value. In some cases, the overriding value can be selected based on a total order defined by values and object identifiers (ids), such that the greater value (or object) overrides the lower (or vice versa). In another example, if different attributes or references are set on different objects, no transformation may be performed and the same operation is returned. The different cases considered for the unary reference operation (e.g., setRef( )) and the attributes (e.g., upd( )) are shown in the equations for $X_5$ and $X_6$ below, respectively.

$$X_5 = T(setRef(p, s, m, n), setRef(o, r, \cdot, q))$$
$$= \begin{cases} id() & \text{if } p = o \wedge s = r \wedge n = q \\ \bot & \text{if } p = o \wedge s = r \wedge n \neq q \\ setRef(p, s, m, n) & \text{otherwise} \end{cases}$$

$$X_6 = T(upd(p, b, w, x), upd(o, a, u, v))$$
$$= \begin{cases} id() & \text{if } p = o \wedge b = a \wedge x = v \\ \bot & \text{if } p = o \wedge b = a \wedge x \neq v \\ upd(p, b, w, x) & \text{otherwise} \end{cases}$$

In some implementations, referring to FIG. 2, the graphical editor (e.g., editor 208a) of a client (e.g., client 202) can perform a sequence of primitive operations, which the user can perceive as a single operation. For example, a user may push a button to add a new business process model (e.g., BPMN) activity to his model (e.g., model 210b). The client can create a new object, where several of the object's properties can be set and the object can be added to the business process model pool. The complex operations can preserve the intention of the user to maintain collaboration. The complex operations are applied in their entirety or, in some cases, may not be applied at all.

For example, two concurrent changes are performed on a document. A first change introduces a sequence flow between activities A and B. A second change deletes activity A. Since sequence flow connectors are objects themselves, introducing a sequence flow between two activities results in three primitive operations: one operation for creating the sequence flow object and the other two operations for setting the source and target references. The sequence flow cannot be connected to activity A as activity A is deleted. This can result in a dangling sequence flow connector, where a dangling sequence flow connector is different from a dangling reference (a reference to a non-existing object) as dangling references may not occur. This is ensured by the way the primitive operations and their transformation are constructed. The graphical editor may not provide the ability to construct dangling connectors by way of applying complex operations locally. Therefore, the operation that creates the sequence flow can be rejected.

In some implementations, a control algorithm chooses which operations are concurrent and as such are transformed. Note that the operations are bound (their parameters are bound to specific values or object identifiers).

A context-based operational transformation (COT) control algorithm can be used with complex operations. For example, causal relationships between operations can be used to determine which operations to transform (a causal theory). In some implementations, causality may not be sufficient in order to make operational transformations work correctly in all cases. For example, control algorithms can produce inconsistent models. In some implementations, the context of an operation can replace causality used in operational transformations. In some implementations, the basic ideas of COT can be adjusted to work with complex operations.

The context of an operation is the model to which the operation is applied. A model can be sufficiently characterized by the operations applied in order to create it. Therefore, the context of an operation $\omega$ applied to model M is the set of original (i.e., non-transformed) primitive operations that produced the model: $C(\omega)=\{\omega_1, \ldots, \omega_n\} \equiv M$.

Figure 4:
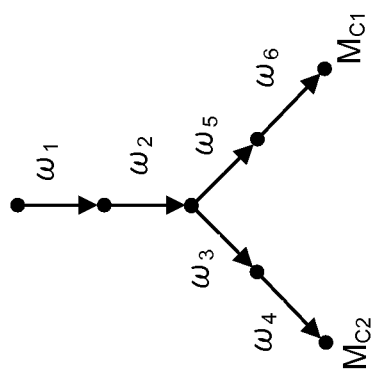
FIG. 4 is a diagram showing a history of a model.

FIG. 4 is a diagram showing a history of a model. The model includes operations and their contexts. Primitive operations (e.g., operations $\omega_1$, $\omega_2$, $\omega_5$, $\omega_6$) can be used to create the model $M_{C1}$. Primitive operations (e.g., operations $(\omega_1, \omega_2, \omega_3, \omega_4)$ can be used to create the model $M_{C2}$.

Figure 5:
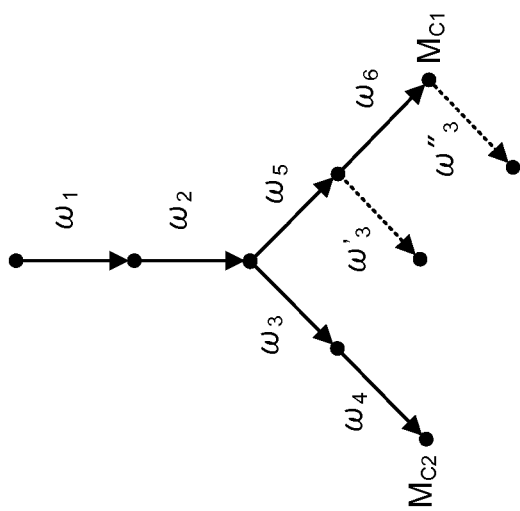
FIG. 5 is a diagram showing transforming a complex operation to be executed on a model.

FIG. 5 is a diagram showing transforming the complex operation $\Omega_3$ to be executed on model $M_{C1}$. For example, consider operation $\omega_4$ in FIG. 5 with the context: $C(\omega_4)=\{\omega_3, \omega_2, \omega_1\}$. The context of a transformed operation is: $C(\omega')=C(\omega) \cup \{org(\omega_x)\}$ where $\omega'=IT(\omega, \omega_x)$ and $org(\omega_x)$ denotes the original (non-transformed) operation of $\omega_x$. The context of a transformed operation $\omega'$ is the context of the non-transformed operation $\omega$ plus the original operation of $\omega_x$.

In line with the context of operations, the history H(M) of a model M can be the set of original operations that lead to its current state. For example, model $M_{C1}$ in FIG. 5 can be characterized by $\{\omega_1, \omega_2, \omega_5, \omega_6\}=H(M_{C1})$. In some implementations, the context of a complex operation $C(\Omega)$ is equivalent to the context of its first primitive operation $C(\Omega)=C(\omega_1)$ where $\Omega=\omega_1, \ldots, \omega_n$. The primitive operations of a complex operation can be consecutive without the interleaving of other operations for all primitive operations $\omega_i(2 \leq i \leq |\Omega|)$ of a complex operation $\Omega$: $C(\omega_i)=\{\omega_{i-1}\} \cup C(\omega_{i-1})$. This ensures that complex operations are concurrent, or are either before or after another complex operation, and not intertwined. For example, $\omega_3$, $\omega_4$ in FIG. 5 may form a complex operation, and $\omega 2$, $\omega 3$, and $\omega 4$ may not. In addition, ensuring that complex operations are concurrent, or are either before or after another complex operation, and not intertwined can be applied on the inverse of complex operations. Given $\Omega=\omega_1, \ldots, \omega_n$, then $\overline{\Omega}=\omega_n, \ldots, \omega_1$ is its inverse with $C(\omega_n)=\{\omega_n\} \cup C(\omega_n)$ and $C(\omega_{n-1})=\{\omega_n\} \cup C(\omega_n)$.

Operations may meet a number of conditions in order for the operations to be transformed against each other. For example, a context condition C1 can be defined where given an original operation $\omega$ and a model M, where $\omega \notin H(M)$, $\omega$ can be transformed for execution on M if $C(\omega) \subset H(M)$. For example, referring to FIG. 5, $\omega_3$ can be transformed for execution on $M_{C1}$ since $C(\omega_3)=\{\omega_1, \omega_2\} \subset H(M_{C1})=\{\omega_1, \omega_2, \omega_5, \omega_6\}$. Operation $\omega_4$ cannot be transformed to be executed on $M_{C2}$ without transforming and executing operation $\omega_3$ first.

For example, a context condition C2 can be defined where given an original operation $\omega$ and a model M, where $\omega \notin H(M)$ and $C(\omega) \subseteq H(M)$, $H(M)-C(\omega)$ is the set of operations that $\omega$ can be transformed against before it can be applied to M. For example, referring to FIG. 5, in order to apply $\omega_3$ to $M_{C2}$, $\omega_3$ can be transformed against $\omega_5$ and $\omega_6$.

For example, a context condition C3 can be defined where given an original operation $\omega$ and a model M, $\omega$ can only be applied to M if $C(\omega)=H(M)$. For example, referring to FIG. 5, $\omega_7$ with context $C(\omega_7)=\{\omega_1, \omega_2, \omega_5, \omega_6\}=H(M_{C1})$ can be executed on $M_{C1}$.

For example, a context condition C4 can be defined where given an original operation $\omega_x$, a (possibly transformed) operation $\omega$ and a model M, where $\omega_x \in C(\omega)$, $\omega_x$ can be transformed to the context of $\omega$ only if $C(\omega_x) \subseteq C(\omega)$. For example, referring to FIG. 5, $\omega_3$ can be transformed to the context of $\omega_6$ as $C(\omega_3)=\{\omega_1, \omega_2\} \subseteq C(\omega_6)=\{\omega_1, \omega_2, \omega_5\}$.

For example, a context condition C5 can be defined where given an original operation $\omega_x$, a (possibly transformed) operation $\omega$, where $\omega_x \in C(\omega)$ and $C(\omega_x) \subseteq C(\omega)$, $C(\omega)-C(\omega_x)$ is the set of operations that $\omega_x$ can be transformed against before it can be IT transformed against $\omega$. For example, referring to FIG. 5, $\omega_3$ can be transformed to the context of $\omega_6$ by transforming it against $C(\omega_3)-C(\omega_6)=\{\omega_5\}$.

For example, a context condition C6 can be defined where any two operations $\omega_a$ and $\omega_b$ can be IT-transformed against each other (IT($\omega_a$, $\omega_b$) or IT($\omega_b, \omega_a$) if $C(\omega_a)=C(\omega_b)$. For example, referring to FIG. 5, $\omega_3$ can be transformed against $\omega_5$.

The context conditions C1-C6 can lead to the formulation of the context-based operational transformation (COT) shown in Algorithms 1, 2 and 3. For example, Algorithm 1 transforms and applies a primitive operation $\omega$ to a model M. Specifically, Algorithm 1 uses the context condition C2 to determine a set of operations against which the primitive operation $\omega$ can be transformed (line 2). Algorithm 1 applies the transformed operation $\omega'$ to the model M(line 3). Algorithm 1 adds the original primitive operation $\omega$ to the model history H(M) (line 4).

Algorithm 1:

Require: $C(\omega) \subseteq H(M)$, i.e. context condition C1 holds.
Ensure: $\omega \in H(M)$ and $\omega$ applied to model M.
1: procedure primitiveCOT($\omega$,M) begin
2: $\omega'$ := transform($\omega$,H(M) − C($\omega$))
3: Add $\omega$ to H(M)
4: M :=$\omega'$(M)
5: end procedure For example, Algorithm 2 transforms a primitive operation co against a set of primitive operations CD. Referring to Algorithm 2, transform($\omega$, CD) can take the primitive operation $\omega$ and transform the operation $\omega$ against all operations $\omega_x$ in CD (line 4) using context condition C5. As the primitive operation $\omega$ is transformed, the context of the primitive operation can be "upgraded" step by step (line 9) so that the primitive operation can be T-transformed (line 5) under context condition C6 and then applied to the model M (in the function primitive COT( )). The case where T( ) returns ⊥ (an unassigned value) can be ignored.

Algorithm 2:

Require: $\omega \notin H(M) \wedge (\forall \omega_x \in CD : C(\omega) \subseteq C(\omega_x))$
Ensure: $C(\omega) \subseteq C(\omega')$ where $\omega'$ = transform($\omega$,CD)
1: function transform ($\omega$,CD) begin
2:    while CD is not empty do
3:       Select and remove $\omega_x$ from CD where $C(\omega_x) \subseteq C(\omega)$
4:       $\omega'_x$:=transform($\omega_x$, $C(\omega) − C(\omega_x)$)
5:       $\omega'$ := T($\omega$, $\omega'_x$)
6:       if $\omega'$ = ⊥ then
7:          Collision with operation $\omega'_x$. Terminate all transform procedures.
8:       end if
9:       $C(\omega')$ := $C(\omega') \cup \{org(\omega'_x)\}$
10:      $\omega$ := $\omega'$
11: end while -continued Algorithm 2:

```
12:     return ω
13: end function
```

Figure 6:
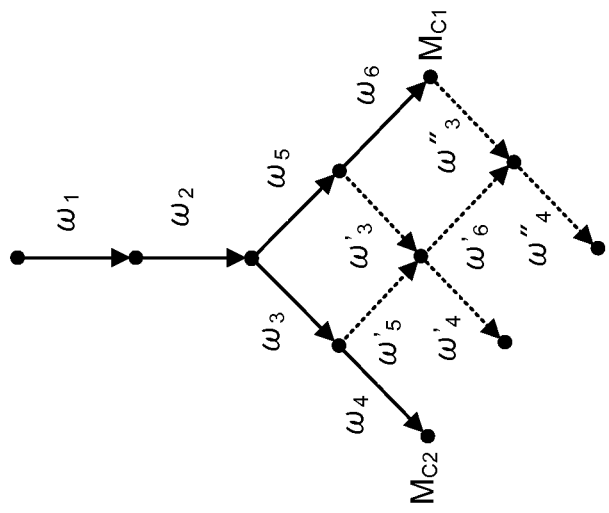
FIG. 6 is a diagram showing the transforming of an alternative complex operation to be executed on a model.

FIG. 6 is a diagram showing the transforming of the complex operation $\Omega_4$ to be executed on model $M_{C1}$. For example, consider the transformation of primitive operations $\omega_3$ and $\omega_4$ to be applicable to model $M_{C1}$. Below is an execution log that includes line numbers for the respective procedures or functions.

primitiveCOT ($\omega_3$, $M_{C1}$)
    2: $\omega'_3$:=transform($\omega_3$, $\{\omega_5, \omega_6\}$)
        3: $\omega_x$=$\omega_5$
        4: $\omega_y$:=transform ($\omega_5$, $\{\ \}$)=$\omega_5$
        5: $\omega'_3$:=T($\omega_3$,$\omega_5$)
        9: C($\omega'_3$):=$\{\omega_1, \omega_2\} \cup \{\omega_5\}$
        3: $\omega_x$:=$\omega_6$
        4: $\omega_y$:=transform($\omega_6$, $\{\ \}$)=$\omega_6$
        5: $\omega''_3$:=T($\omega'_3$, $\omega_6$)
        9: C($\omega''_3$):=$\{\omega_1, \omega_2, \omega_5\} \cup \{\omega_6\}$
        3: H($M_{C1}$)=$\{(\omega_1, \omega_2, \omega_5, \omega_6\} \cup \{\omega_3\}$
        4: $M_{C1}$:=$\omega''_3$($M_{C1}$)

In the next step, operation $\omega_4$ is transformed. The recursion in line 14 ($\omega'_6$:=T($\omega_6$, $\omega_3$)) is executed to account for the transformation of operation $\omega_3$ against operation $\omega_5$ and operation $\omega_6$. The recursion demonstrates the possible difference between COT and algorithms based on the causal theory, which would omit the recursive step.

primitiveCOT ($\omega_4$, $M_{C1}$)
    2: $\omega''_4$:=transform($\omega_4$, $\{\omega_5, \omega_6\}$)
        3: $\omega_x$=$\omega_5$
        4: $\omega_y$:=transform ($\omega_5$, $\{\omega_3\}$)=$\omega'_5$
            3: $\omega_x$:=$\omega_3$
            4: $\omega_y$:=transform ($\omega_3$, $\{\ \}$)=$\omega_3$
            5: $\omega'_5$:=T($\omega_5$, $\omega_3$)
            9: C($\omega'_5$):=$\{\omega_1, \omega_2\} \cup \{\omega_3\}$
        5: $\omega'_4$:=T($\omega_4$, $\omega'_5$)
        6: C($\omega'_4$):=$\{\omega_1, \omega_2, \omega_3\} \cup \{\omega_5\}$
        3: $\omega_x$=$\omega_6$
        4: $\omega_y$:=transform ($\omega_6$, $\{\omega_3\}$)=$\omega'_6$
            3: $\omega_x$:=$\omega_3$
            4: $\omega_y$:=transform ($\omega_3$, $\{\ \}$)=$\omega_3$
            5: $\omega'_6$:=T($\omega_6$, $\omega_3$)
            9: C($\omega'_6$):=$\{\omega_1, \omega_2, \omega_5\} \cup \{\omega_3\}$
        5: $\omega'_4$:=T($\omega'_4$, $\omega'_6$)
        9: C($\omega''_4$):=$\{\omega_1, \omega_2, \omega3, \omega5\} \cup \{\omega_6\}$
        9: H($M_{C1}$)=$\{\omega_1, \omega_2, \omega_5, \omega_6, \omega_3\} \cup \{\omega_4\}$
        4: $M_{C1}$:=$\omega''_4$($M_{C1}$)

Algorithm 3 transforms and applies a complex operation $\Omega$ to a model M. Algorithm 3 demonstrates that the transforming and applying of complex operations to a model can occur in a way similar as the transforming and applying of primitive operations to a model. For example, a difference between the transforming and applying of the complex operations verses the transforming and applying of primitive operations can be that primitive operations may not be applied to the model directly after the transformation (line 4). In addition, the complex operations can be collected resulting in a complex operation $\Omega'$ (line 7). The collection of complex operations, complex operation $\Omega'$, can be applied to the model once the primitive operations are transformed (line 10). Applying the complex operation $\Omega'$ to the model once the primitive operations are transformed can ensure that the complex operation $\Omega'$ is transformed either entirely or not at all. If a collision occurs due to T( ) returning $\bot$, the algorithm 3 is exited (line 5).

Algorithm 3:

```
Require: Ω ∉ H(M) ∧ C(Ω) ⊆ H(M)
Ensure: Ω is either entirely transformed and applied or not
transformed at all.
  1: procedure complexCOT(Ω, M) begin
  2:     temp := H(M)
  3:     for ω₁ to ωₙ in Ω do
  4:         ωᵢ = transform(ωᵢ, H(M) − C(ω))
  5:         if collision occurred in transform then exit
  6:         Add ωᵢ to temp
  7:         Append ω'ᵢ to Ω'
  8:     end for
  9:     Add temp to H(M)
 10: end procedure
```

Figure 7:
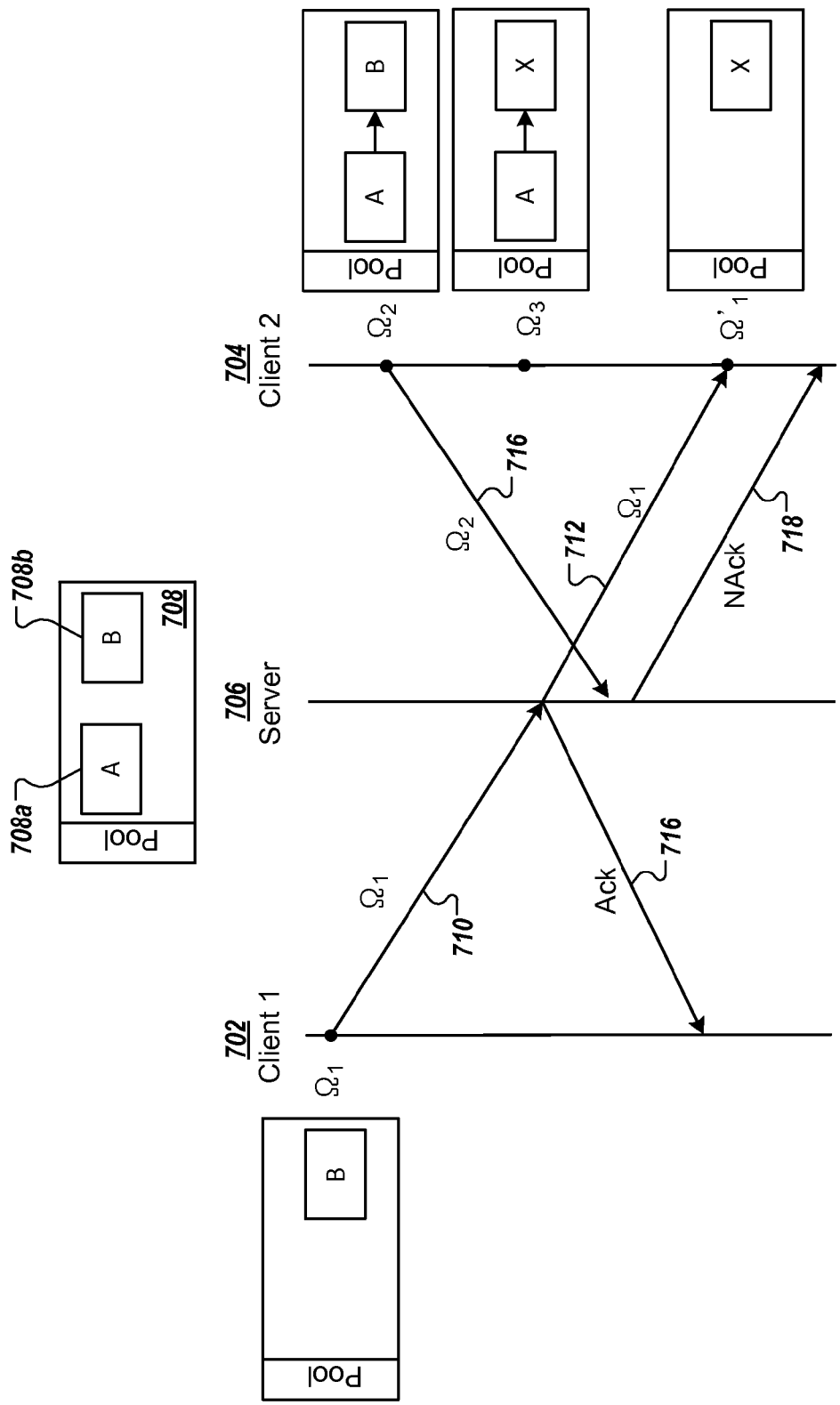
FIG. 7 is a block diagram of an example for handling conflicting operations in a business process model.

FIG. 7 is a block diagram of an example for handling conflicting operations in a business process model. In the example of FIG. 7, complex operation $\Omega_1$ and complex operation $\Omega_2$ are in conflict. Inclusive transformations can use algorithms 1, 2 and 3. Extensions can be made to algorithms 1, 2, and 3 to enable exclusive transformations to use algorithms 1, 2, and 3 where the exclusive transformation may return $\bot$ (i.e., an unassigned value) when a conflict occurs. For example, the generic platform 200 shown in FIG. 2 can be used for the collaborative modeling system for the complex operations.

Referring to FIG. 7, a server 706 and clients 702, 704 have a synchronized business process model (BPMN model) that includes activities 708*a*, 708*b* in pool 708. Client 702 deletes activity 708*a* by executing complex operation $\Omega_1$=delObj (A). Meanwhile, client 704 creates a sequence flow connecting activity 708*a* and activity 708*b* by executing complex operation $\Omega_2$=addObj(SF), setRef (SF, src, $\bot$, A), setRef (SF, tgt, $\bot$, B). A user of client 702 (a participant) sends the complex operation $\Omega_1$ to the server 706 (arrow 710). A user of client 704 (another participant) sends the complex operation $\Omega_2$ to the server 706 (arrow 716) after the user of client 702 sends the complex operation $\Omega_1$ to the server 706 (arrow 710). While the user of client 702 is waiting for a response from the server 706 (Ack as shown by arrow 714), client 704 performs another change to the activities 708*a*, 708*b*, changing the name of activity 708*b* to X by executing complex operation $\Omega_3$=upd(B, name, B, X). The client 704 may not send the complex operation $\Omega_3$ to the server 706 at this time because the client 704 has to wait for the response from the server 706 to the sending of the complex operation $\Omega_2$ to the server 706.

Client 704 receives complex operation $\Omega 1$ from the server 706 (arrow 712), which tells the user of client 704 to delete activity 708*a*. In addition, the client 704 receives no acknowledgement (NAck as shown by arrow 718) from the server 706 for the complex operation $\Omega_2$ (the server does not acknowledge complex operation $\Omega_2$). The execution of the complex operation $\Omega_1$ is incompatible with the creation of the sequence flow connecting A and B (complex operation $\Omega_2$ executed by client 704), since the exclusive operational transformation (as shown in Table 1) returns $\bot$ for T (setRef (SF, src, $\bot$, A), delObj(A)). The operation sent by the server 706 takes precedence over operation executed by the client 704 (complex operation $\Omega_2$) as the operation sent by the server 706 has already been acknowledge to the originator (Ack as shown by arrow 714 to client 702) and, in addition, may have been already broadcasted to other clients (not shown). As such, client 704 can undo some of the user's local changes (e.g., undo or perform the inverse of complex operation $\Omega_2$) in order to be able to apply complex operation $\Omega_1$. In addition, client 704 may retain and execute additional non-conflicting operations (e.g., complex operation $\Omega_3$). After the reconciliation procedure, the model of client 704 reflects the application of complex model $\Omega'_1$ and complex model $\Omega'_3$ (not shown), which is a transformed version of complex model $\Omega_3$ to account for the absence of the execution of complex model $\Omega_2$.

As described with reference to FIG. 7, if a conflicting operation is encountered in the local history of the model on the client, the conflicting operation can be undone in order to be able to apply the incoming operation from the server. In some implementations, the goal is to remove as few operations as possible. The client can determine the operations to remove by rolling back the conflicting operation and all other subsequently applied operations, reconciling the removed operations, and reapplying the reconciled operations. The client can repeat these steps until all collisions are removed and the complex operation $\Omega$ is applied to the model M successfully.

Algorithm 4 removes a complex operation from a client's local history where the server does not acknowledge the local history. If a collision occurs, the client rolls back the conflicting operation (line 5), reconciles the removed operation (line 6), and reapplies the reconciled operation (line 7). The client performs these steps until all operations are removed.

---
Algorithm 4:
---
Require: Complex operation $\Omega$ and model M such that $\Omega \notin H(M)$ and complex operation $\Omega$ is not acknowledged by the server
Ensure: $\Omega \in H(M)$, complex operation $\Omega$ applied to model M
1:   procedure ecot($\Omega$, M) begin
2:   loop
3:       complexCOT($\Omega$, H(M) − C($\Omega$))
4:       if collision with complex operation $\Omega_c$ occurs then
5:           R := rollback($\Omega_c$, M)
6:           R' := reconcile(R, $\Omega_c$)
7:           reapply(R', M)
8:       else
9:           exit
10:      end if
11:  end loop
12:  end procedure
---

Algorithm 5 removes a complex operation from a client's local history where the server did not acknowledge the complex operation by rolling back the conflicting operation. The client can roll back complex operations by applying the inverse of each operation included in the complex operations in reverse order, subsequently removing the operations from the model history. The client can access the execution log of the model (log $L(M) = \Omega_n, \ldots, \Omega_1$) and compare it to the local model history. As compared to the model history, the execution log includes the transformed operations in the sequence of their application. Going through the execution log in reverse order, the most recently applied operation is removed (line 3) and its inverse is applied to the model (line 4) and removed from the model history (line 5). For subsequent processing, a list of removed original operations is kept (line 9) in the reverse order of their removal (i.e. the order of the original application). These steps are repeated until the conflicting complex operation $\Omega$ is entirely removed (line 6). Algorithm 5 can terminate as it iterates over the (finite) execution log, and removes the last operation until the conflicting operation $\Omega$ is reached.

---
Algorithm 5:
---
Require: Complex operation $\Omega$ and model M such that $\Omega \in L(M)$ and complex operation $\Omega$ is not acknowledged by the server
Ensure: all effects of the complex operation Q and subsequent operations are removed from the model M and the originals returned
1:   function rollback($\Omega$, M) begin
2:   loop
3:       Remove the last complex operation $\Omega_x$ in L(M)
4:       M := $\overline{\Omega}_x$(M)
5:       Remove orig($\Omega_x$) from H(M)
6:       if $\Omega_x = \Omega$ then
7:           return R
8:       end if
9:       Prepend orig($\Omega_x$) to R
10:  end loop
11:  end function
---

Algorithm 6 reconciles a sequence of operations with the removal of complex operation $\Omega$. The steps performed by algorithm 6 reconcile the retained original operations by removing the conflicting operation. As such, all operations that have the conflicting operation in their context are of interest. These operations were generated after the application of the conflicting operation and therefore can be transformed to account for the absence of the conflicting operation, which is to be removed.

As previously described, an operation followed by its inverse has no net effect. Therefore, removing the conflicting operation from the context of the other operations by executing its inverse can result in no net effect. Therefore, the client can create the inverse of the conflicting operation such that it directly follows the original conflicting operation. The process of determining an inverse operation for each conflicting operation can effectively remove all effects of the conflicting operation. Any additional operations with the conflicting operation in their context can also be transformed against the inverse of the conflicting operation. All operations can have the conflicting operation directly followed by its inverse operation in their context. Since an operation followed by its inverse has no net effect, the pair can be safely removed from the contexts of all other operations.

Figures 8A, 8B, 8C:
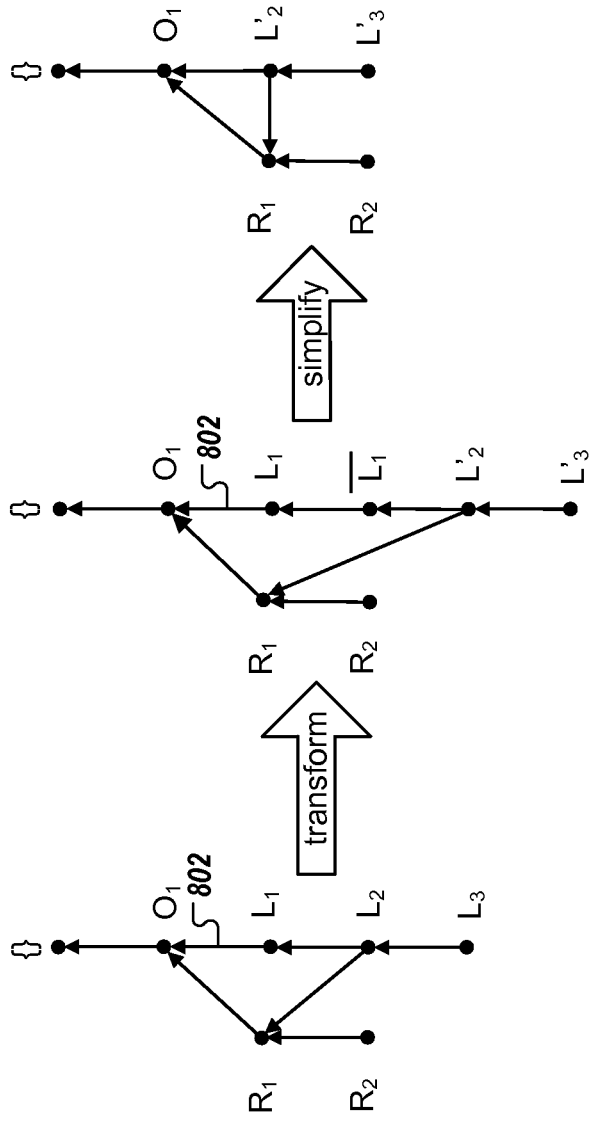
FIGS. 8A-C are diagrams showing the removal of a conflicting operation.

FIGS. 8A-C are diagrams showing the removal of conflicting operation $L_1$. In the example of FIGS. 8A-C, L denotes local operations on a client that are not acknowledged by a server. R denotes remote operations sent by the server to the client. As shown in FIG. 8A, arrow 802 indicates that an operation $O_1$ is in the context of local operation $L_1$. First, the local client executes the operation $O_1$, common to all participants. Second, the local client executes a local operation $L_1$. Concurrently, a remote client executes remote operation $R_1$, which is then received by the local client. Upon the local client receiving remote operation $R_1$, the client executes local operation $L_2$ and local operation $L_3$. Subsequent to executing local operation $L_2$ and local operation $L_3$, the client receives remote operation $R_2$, which is in conflict with local operation $L_1$. The server has not acknowledged any of the local operations (local operations $L_1$, $L_2$ and $L_3$). In addition, the Operation $O_1$ may not be in conflict with any other operation as it has already been acknowledged by the server, which is implied by operation $O_1$ being in the context of remote operation $R_1$.

In order for the client to apply remote operation $R_2$, local operation $L_1$ has to be undone. The client can undo the application of local operation $L_1$ without losing the results of the application of the local operation $L_2$ and the local operation $L_3$. In addition, the client can undo the application of local operation $L_1$ without losing the results of the application of any remote operations (e.g., remote operation $R_1$).

The following procedure leverages the fact that an operation followed by its inverse has no net result ($\overline{\Omega} \circ \Omega = \text{id}(\,)$). In order to undo application of local operation $L_1$, the client can insert the inverse of the local operation $L_1$ (local operation $\overline{L_1}$) right after the local operation $L_1$. In addition, the client can transform all other local operations (e.g., local operations $L_2$ and $L_3$) against the local operation $\overline{L_1}$, such that they have local operation $\overline{L_1}$ in their context as shown in FIG. 8B. Since an operation followed by its inverse has no effect on the model, the local operation pair $L_1$, $\overline{L_1}$ can be removed from the contexts of the other local operations (e.g., local operations $L_2$ and $L_3$) as shown in FIG. 8C. Note, that the remote operation $R_1$ and remote operation $R_2$ are not affected by the removal of the local operation pair $L_1$, $\overline{L_1}$ as they do not depend on local operation $L_1$.

In some implementations, other additional local operations may depend on local operation $L_1$ in such a way that they cannot be transformed against the inverse of the local operation $L_1$ (local operation $\overline{L_1}$). For example, this situation can occur when the local operation $L_1$ creates objects, which are then manipulated by other subsequent local operations. In this example, one or more subsequent local operations can also be removed by recursively applying the same procedure used to remove local operation $L_1$.

Algorithm 6 reconciles a sequence of operations with the removal of the conflicting operation $\Omega$. Algorithm 6 takes the conflicting operation $\Omega$, which is to be removed, as input, as well as the sequence of removed operations R, returned by Algorithm 5. Algorithm 6 goes through the operations in the sequence of removed operations R (line 3). If the current operation $\Omega_x$ is in the context of the conflicting operation $\Omega$ (line 4), the current operation is transformed against $\{\Omega, \overline{\Omega}\}$ (line 5).

In some implementations, the transformation may not be possible. For example, if the current operation $\Omega_x$ cannot be transformed against the conflicting operation $\Omega$ because the current operation $\Omega_x$ changes an attribute of an object created by the conflicting operation $\Omega$, the current operation $\Omega_x$ can be excluded from the sequence of removed operations R. The procedure in Algorithm 6 is then recursively called (line 7).

In some implementations, if the transformation succeeds, the transformation can be permanent and the transformed operation $\Omega'_x$ becomes its one original operation (line 9) and $\{\Omega, \overline{\Omega}\}$ are both removed from context of the current operation $\Omega_x$, just as if the application of the conflicting operation $\Omega$ never occurred. The transformed operation $\Omega'_x$ is added to the sequence of removed transformed operations R'. For example, if the current operation $\Omega_x$ is not in the context of the conflicting operation $\Omega$, the current operation $\Omega_x$ may not be transformed and can be added to the sequence of removed transformed operations R' without any changes (line 14).

The algorithm 6 iterates over the sequence of removed operations R and removes the first operation in the sequence. Should a collision occur, the recursion is invoked by passing the sequence of removed operations R without the offending operation that caused the collision. The sequence of removed operations R is reduced by at least one operation (the operation that caused the collision). In addition, new operations may not be added to the sequence of removed operations R. In a worst case scenario, the sequence of removed operations R includes operations that cause collisions. For example, assume the sequence of removed operations R consists of a sequence of complex operations each of which adds a new object and manipulates the object created by the previous. Removing the first operation in such a sequence can ripple through the entire chain of operations and cause the other operations to be removed as well. Therefore, the sequence of removed operations R is continuously reduced in size and subsequently the length of R can bind the recursive calls resulting in the eventual termination of Algorithm 6.

In some implementations, if it is not important to retain the local operations with a potential for further conflicts, Algorithm 6 can be simplified to return current operations $\Omega_x$ which do not have the conflicting operation $\Omega$ in their context. For example, this simplification results in the removal of lines 5 through 12 in Algorithm 6.

Algorithm 6:

Require: Complex operation $\Omega$ and model M such that $\Omega \in H(M)$ and complex operation $\Omega$ is not acknowledged by the server
Ensure: $\forall \Omega_x \in R' : \Omega_x \notin C(\Omega_x)$
 1: function reconcile ($\Omega$, R) begin
 2:   while R is not empty do
 3:     Remove the first operation $\Omega_x$ in R
 4:     if $\Omega \in C(\text{orig}(\Omega_x))$ then
 5:       $\Omega'_x := \text{transform}(\Omega_x, \{\Omega, \overline{\Omega}\})$
 6:       if collision occurs then
 7:         R := reconcile($\Omega_x$, R)
 8:       else
 9:         
10:         org($\Omega'_x$) := $\Omega'_x$
11:         C($\Omega'_x$) := C($\Omega'_x$) − $\{\Omega, \overline{\Omega}\}$
12:         Append $\Omega'_x$ to R'
13:       end if
14:     else
15:       Append $\Omega_x$ to R'
16:   end while
17:   return R'
18: end function Algorithm 7 reapplies the reconciled sequence of removed operations to the model M. For example, the reconciled operations are kept in the same order as they are removed, although some of the reconciled operations may have been transformed or removed. Algorithm 6 removed the conflicting operation from any subsequent operation's context. Therefore, the subsequent operation can be transformed (recall that the sequence of removed operations R can also include original remote operations) and applied to the model.

Algorithm 7:

Require:
Ensure:
1: procedure reapply(R, M) begin
2:   for $\Omega_1$ to $\Omega_n$ in R do
3:     R := complexCOT($\Omega_i$, M)
4:   end for
5: end Algorithms 5, 6, and 7 that implement rollback, reconcile and reapply can terminate after a finite number of steps. In addition, Algorithm 4 repeats the steps of rollback, reconcile and reapply until an operation $\Omega$ can be successfully applied to the model. In some implementations, if Algorithm 4 encounters a conflict with an existing operation, the offending operation to the existing operation is removed (through rollback, reconcile, and reapply) and a new attempt to apply the existing operation is performed. In some implementations, should the attempt to apply the existing operation fail again, the additional offending operation is also removed and the process is repeated. With each such iteration, the number of potentially conflicting operations (the operations not in the context of the existing operation Ω) is reduced by one and will eventually be zero (in the worst case where all operations conflict with the existing operation). The existing operation Ω is then guaranteed to be applicable and the algorithm terminates.

In order to achieve consistency, copies of the model (e.g., models on multiple clients) should converge to one set of equivalent models. For example, in order to produce a consistent model, the consistency property (exclusive transformation) should hold for the primitive operations. In addition, conflict resolution enables the models to converge in the cases where the transformation may not be possible.

The algorithms described in this document may be complex at runtime. For example, caching can be used to reduce runtime complexity. An exponential complexity at runtime can be based on the number of operations used by the transform function of the COT algorithm to recursively compute the same transformations. Caching the results of a transformation may lead to a reduction in runtime complexity.

For example, referring to Algorithm 2, line 4, the transform function upgrades operation $\omega_x$ to the context of operation $\omega$. The original version of operation $\omega_x$ (org($\omega_x$)) and the context of operation $\omega$ can uniquely identify the version produced by the transform. By caching the result, the transform function need not be performed again in the case where operation $\omega_x$ has to be upgraded again to the context of operation $\omega$. The cache can include an original operation identifying a group of the operation's transformed versions. Within this group, operation $\omega$ identifies the version of interest, which has the same context as operation $\omega$.

Continuing to refer to Algorithm 2, a cache is filled after line 5 with the operation version $\omega'$, the result of the transformation T, which is then added to the group of org($\omega'$). For further optimization, an operation $\omega''=T(\omega'_x,\omega)$ can also be added to the cache. Referring to FIGS. 6 and 7, the caching of $\omega''=T(\omega'_x,\omega)$ can be beneficial. First, the cached operation $\omega''$ can be used when transforming operation $\omega_3$, as $\omega_3$ is transformed against $\omega_5$. In addition, the cached operation $\omega''$ can be used when transforming operation $\omega_4$, as $\omega_5$ is transformed against $\omega_3$.

A cache strategy can reduce an exponential runtime complexity to a quadratic complexity at the cost of a quadratic space complexity for storing multiple different versions of operations. In some implementations, many of the versions of the cached operations may not be used. In some implementations, when the version of the operation is used out of the cache, the version of the operation may be used once and then superseded by a newer version of the operation. In some implementations, there may be a group of versions of operations that are used more than once. These operation versions may be reused first. In some cases, an older version of an operation may not be used, a newer version may be used once and then superseded by yet another newer version. In order to manage the cache in a productive manner, the cache will store the most recently created version of an operation (deleting all older versions of the operation from the cache). In addition, the cache will permanently store the version of the operation that gets re-used first. This cache management strategy can work independent of the number of parallel operation streams (active participants at any one time) and can reduce the runtime to quadratic complexity and space complexity down to a linear complexity.

Transformation operations can be optimized by efficiently representing context. For example, let $\omega_{ij}$ be the j-th operation performed by client i. If C($\omega$) includes $\omega_{ij}$ it can also include $\omega_{ij-1}, \omega_{ij-2}, \ldots, \omega_{i1}$. Therefore, the largest sequence number of the operation generated by the client can characterize the context of an operation. A vector $CV(\omega)=(s_1, \ldots, s_n)$ can be used to identify operations across a number of clients, where $s_i$ is the largest sequence number generated by client i ($1 \leq i < n$) and n is the number of different clients. $CV(\omega)[i]$ can refer to the sequence number of client i in the context of $\omega$.

Similar to the context vector, a time stamp vector of an operation $\omega$ can be defined as $T(\omega)=(s_1, \ldots, s_n)$ where $T(\omega)[j]=CV(\omega)[j]+1$ for client j and $T(\omega)[i]=CV(\omega)[i]$ for $i \neq j$. Assuming client 1 generated operation $\omega_1$ with $CV(\omega)=(0, 0)$, its time stamp is $T(\omega_1)=(1, 0)$.

Referring to FIG. 5 and Table 2 below, the following relations on vectors $a=(a_1, \ldots, a_n)$ and $b=(b_1, \ldots, bn)$ are introduced. If $ai \leq bi$ for ($i=1, \ldots, n$), then $a \leq b$ for all components ai. Similarly, $a<b$, if there is (at least) one pair aj, bj such that $aj<bj$ and for all other pairs $ai \leq bi$. If neither $a \leq b$ nor $b \leq a$, then $a \| b$.

Based on the vector representation of the contexts, it can also be decided whether the context of $\omega_a$ is a subset of the context of $\omega_b$, by checking whether the components of $CV(\omega_a)$ are less than or equal to the corresponding component of CV $\omega_b$):

$$C(\omega_a) \subseteq C(\omega_b) \Leftrightarrow CV(\omega_a) \leq CV(\omega_b).$$

For example, assume $CV(\omega_3)=(1, 1)$ and $CV(\omega_4)=(1, 2)$, then $C(\omega_3) \subset C(\omega_4)$. In addition, $C(\omega_4) \not\subset C(\omega_3)$. For $CV(\omega_4)=(1, \overline{2})$ and $CV(\omega_6)=(2, 1)$, $C(\omega_4)$ is not a subset of $C(\omega_6)$ and vice versa. Using the vector representation, it can also be decided whether an operation $\omega_a$ is part of the context $C(\omega_4)$. This is the case if the components of the time stamp $T(\omega_a)$ are less than or equal to the corresponding components of the context vector $CV(\Omega_b)$:

$$\omega_a \in C(\omega_b) \Leftrightarrow T(\omega_a) \leq CV(\omega_b)$$

For example, $\omega_3$ with $T(\omega_3)=(1, 2)$ is in the context of $\omega_3$ with $CV(\omega_4)=(1, 2)$, and is not in the context of $\omega_5$ with $CV(\omega_5)=(1, 1)$, where the context of $\omega_3$ is a subset of the context of $\omega_5$. Adding an operation $\omega_b$ to the context of $\omega_1$, where $C(\omega_a)=C(\omega_b)$ can be achieved by setting $T(\omega_b)$ and $CV(\omega_a)$ results in:

$$C(\omega'_a):=C(\omega_a) \cup \{\omega_b\} \wedge C(\omega_a)=C(\omega_b) \Leftrightarrow CV(\omega'_a):=T(\omega_b)$$

This effectively ensures that $T(\omega_b) \leq CV(\omega'_a)$ and therefore $\omega_b \in C(\omega'_a)$.

For example, when transforming $\omega_3$ against $\omega_5$, $C(\omega'_3)=C(\omega_3) \cup \{\omega_5\}$ because $CV(\omega_3)=(1, 1)$ and $T(\omega_5)=(2, 1)$ and therefore $CV(\omega_3)=(2, 1)$.

The last operation that is performed as part of the ecot algorithm (e.g., see Algorithm 4) is subtracting the context of an operation from the context of another operation. This can be achieved by utilizing some of the expressions above, such as:

$$C(\omega_a)-C(\omega_b)=\{\omega | \omega \in C(\omega_a) \wedge \omega \notin C(\omega_b)\}=\{\omega | T(\omega) \leq CV(\omega_a) \wedge T(\omega) \not\leq CV(\omega_b)\}$$

Similarly, for subtracting a context from the model history:

$$H(M)-C(\omega)=\{\omega_x | \omega_x \in H(M) \wedge \omega_x \notin C(\omega)\}=\{\omega_x | T(\omega_x) \leq T(M) \wedge T(\omega x) \not\leq CV(\omega)\}$$

The COT algorithm can compute the context difference frequently. An implementation of the COT algorithm that includes iterating over the model history and checking if each operation falls into the context difference can be computationally expensive.

TABLE 2

| Operation | $CV(\omega_i) =$ | $T(\omega_i) =$ |
|---|---|---|
| $\omega_1$ | (0,0) | (1,0) |
| $\omega_2$ | (1,0) | (1,1) |
| $\omega_3$ | (1,1) | (1,2) |
| $\omega_4$ | (1,2) | (1,3) |
| $\omega_5$ | (1,1) | (2,1) |
| $\omega_6$ | (2,1) | (3,1) |

The history H of a model M can be interpreted as a set of sequences or lists each of which holds the sequential operations of a different client, using the context vectors or time stamp vectors as indices into the lists that mark the range of operations to include in the difference. In some implementations, the difference can be computed in constant time (assuming the number of clients is constant). The supremum and infimum controlling the difference can be defined as $$\inf(C(\omega_a)-C(\omega_b))=CV(\omega_b)$$

$$\sup(C(\omega_a)-C(\omega_b))=(\max CV(\omega_a)[i], CV(\omega_b)[i]_{i=1,\ldots,n}$$

$$\inf(C(\omega_a)-C(\omega_b))<T(\omega_d)\leq\sup(C(\omega_a)-C(\omega_b))$$

There are a number of optimizations that can reduce the complexity from an exponential level down to sub-linear level. Bypass recursive transformations are based on two observations. Firstly, the transformation matrix in Table 1 includes transformations which unconditionally return the original operation (e.g. T(addObj(p), addRef(o,r,q,i)), i.e. no actual transformation is performed. Secondly, the type of an operation stays the same or is changed into an identical operation (the operation that does nothing). The transforming and the addObj( ) operation can result in an addObj( ) or id( ) operation, and not in adelRef( )operation. Both observations taken together can be used to bypass an entire recursive decent in Algorithm 2. If $\omega$ and $\omega_x$ fall into the previously described category (i.e. an actual transformation is not performed), the recursion in line 4 can be bypassed by assigning $\omega_x$ to $\omega'_x$.

Another worthwhile observation is that operations can be transformed against each other if they manipulate the same objects (leapfrog). For example, when transforming delObj (p) against addRef(o, r, q, i), an actual transformation can be performed if p=o or p=q. If not, delObj(p) is returned. This observation can be extrapolated to a whole set of operations. If an operation to be transformed against a whole set of operations manipulates different objects than the set of operations, the operation can leapfrog the entire set, as the transformation would yield the original operation. This observation can be applied in Algorithm 2 to bypass the entire while loop (lines 2 through to 11).

Algorithm 2 can perform computing a set difference multiple times. If implemented naively, this operation can be computationally expensive, as it has to check every operation in one set if it is also contained in the other set and therefore can be excluded from the result. An alternative method of computing differences can be based on context vectors. To perform set differences in constant time, the history H of a model M (the set of all operations applied to the model) is interpreted as a set of sequences as opposed to a plain set. The set of sequences includes one operation sequence per participant. Each sequence contains the operations issued by the respective participant in the same order in which they were issued. As such, context vectors can be used as pointers into these operation sequences as each component in the context vector represents the number of operations issued from the corresponding client that were included in the context.

The difference $C(o_1)-C(o_2)$ of two operation contexts of $o_1, o_2$ can be sufficiently characterized by the two operations' context vectors $CV(o_1)$ and $CV(o_2)$. The difference then includes all operations with sequence numbers less than $CV(o_1)$ and greater then $CV(o_2)$. Using the above outlined structure of the history, the context vectors can be used as pointers in to the sequences of operations. The operation difference does not have to be materialized and can be sorted with pointers only. It can also be enumerated without materializing. This reduces the time for computing differences and for selecting and removing operations with sub-contexts (line 3 in Algorithm 2) to constant time.

Figure 9:
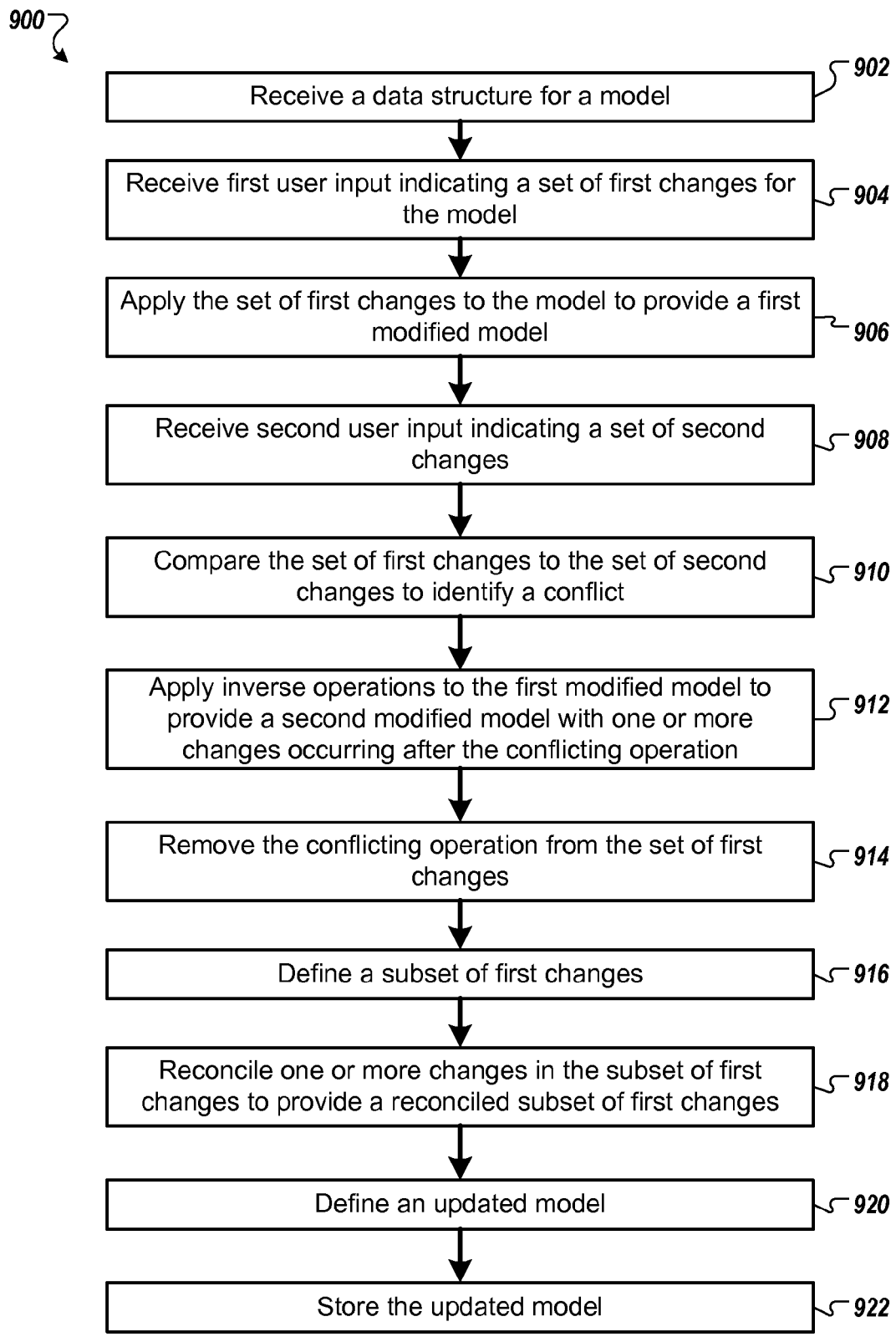
FIG. 9 is a flow chart of an example process for handling and removal of conflicting operations in a business model.

FIG. 9 is a flow chart of an example process 900 for handling and removal of conflicting operations in a business process model. A data structure for a model is received (902). Referring to FIG. 3, an example model data structure (e.g., model data structure 300) can include of a set of objects (e.g., nodes in a graph) and references between objects (e.g., named edges on the graph). First user input indicating a set of first changes for the model is received (904). For example, referring to FIG. 7, a user of client 702 sends the complex operation $\Omega_1$ (a set of first changes) to the server 706 for a model that includes activities 708a, 708b in pool 708. The set of first changes is applied to the model to provide a first modified model (906). For example, client 702 deletes activity 708a by executing the complex operation $\Omega_1$=delObj(A). Second user input is received indicating a set of second changes (908). For example, a user of client 704 sends the complex operation $\Omega_2$ (a second set of changes) to the server 706 after the user of client 702 sends the complex operation $\Omega_1$ to the server 706. The set of first changes is compared to the set of second changes to identify a conflict (910). For example, an execution log for a model can include transformed operations (the first set of changes) in the sequence of their application to the model (e.g., complex operation $\Omega_1$). A model history can include the second set of changes (e.g., complex operation $\Omega_2$). The execution log for the model can be compared to the model history for the model to identify a conflicting operation. For example, referring to FIG. 7, the execution of the complex operation $\Omega_1$ is incompatible with the execution of complex operation $\Omega_2$.

Inverse operations are applied to the first modified model to provide a second modified model with one or more changes occurring after the conflicting operation (912). The conflicting operation is removed from the set of first changes (914). A subset of first changes is defined (916). One or more changes in the subset of first changes is reconciled to provide a reconciled subset of first changes (918). An updated model is defined (920). The updated model is stored (922).

For example, Algorithm 5 can perform rollback. The conflicting operation is identified. The execution log is traversed in reverse order where the most recently applied operation listed in the execution log is removed from the log and inverse of the removed operation is applied to the model. The execution log continues to be traversed until the conflicting operation is reached. For subsequent processing, a list of removed original operations is kept in the reverse order of their removal (i.e. the order of the original application). These steps are repeated until the conflicting operation is entirely removed.

For example, Algorithm 6 can perform reconciliation. Algorithm 6 takes the conflicting operation and the sequence of removed operations and goes through the operations in the sequence of removed operations. If the current operation is in the context of the conflicting operation, the current operation is transformed against the conflicting operation. If the transformation is not possible, the current operation is excluded from the sequence of removed operations.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say, methods in accordance with the present disclosure are not limited to the combinations of aspects and features specifically described herein, but also include any combination of the aspects and features provided.

Figure 10:
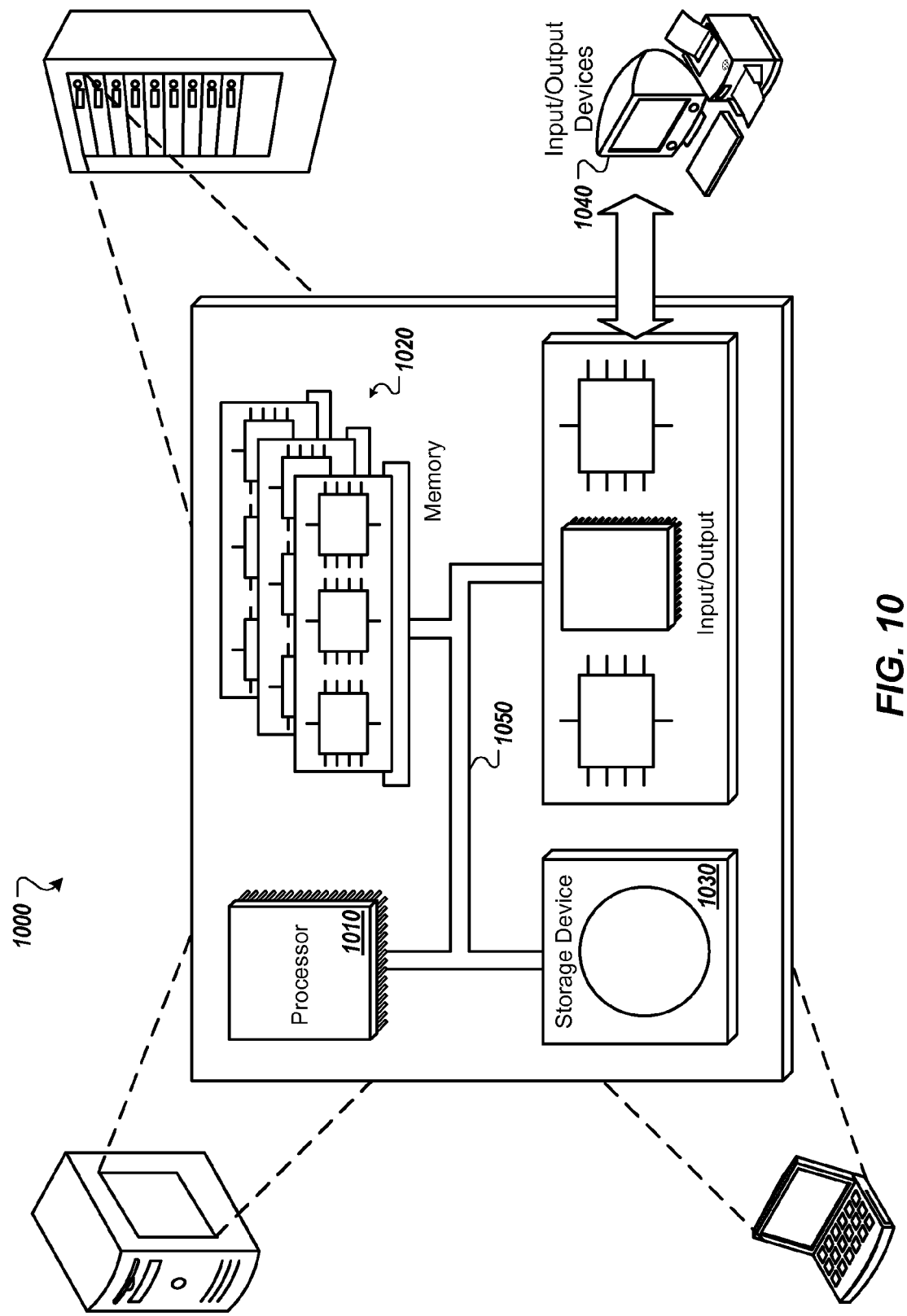
FIG. 10 is a schematic diagram of an example computing system that can be used to execute implementations of the present disclosure.

Referring now to FIG. 10, a schematic diagram of an example computing system 1000 is provided. The system 1000 can be used for the operations described in association with the implementations described herein. For example, the system 1000 may be included in any or all of the server components discussed herein. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit. The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device. The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as Erasable Programmable Read Only Memory (EPROM), Electrically Erasable Programmable Read Only Memory (EEPROM), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for maintaining consistency of a data structure, the method comprising:
   retrieving, at a computing device, the data structure from computer-readable memory, the data structure comprising a central model provided as a tuple that comprises a plurality of objects, a function that maps objects of the plurality of objects and attribute names to value assignments, and references between objects;
   receiving, at the computing device, first user input indicating a set of first changes that have been applied to a first local model and that are to be applied to the central model, each change in the set of first changes comprising one or more primitive operations, each primitive operation being executable to modify the central model;
   applying changes of the set of first changes to the central model to provide a first modified central model;
   receiving, at the computing device, second user input indicating a set of second changes that have been applied to a second local model and that are to be applied to the central model, each change in the set of second changes comprising one or more primitive operations, each primitive operation being executable to modify the central model;
   comparing the set of first changes to the set of second changes to identify a conflicting operation;
   applying a first set of one or more inverse operations to the first modified central model to provide a second modified central model, the one or more inverse operations corresponding to the conflicting operation and to one or more changes occurring after the conflicting operation;
   removing the conflicting operation from the set of first changes;
   defining a subset of first changes, the subset of first changes comprising the one or more changes occurring after the conflicting operation;
   reconciling one or more changes in the subset of first changes based on removal of the conflicting operation to provide a reconciled subset of first changes;
   defining an updated central model by applying changes of the reconciled subset of first changes to the second modified central model;
   storing the central updated model in computer-readable memory; and
   transmitting the first set of one or more inverse operations and the reconciled subset of first changes to modify the first local model and a second set of one or more inverse operations and a reconciled subset of second changes to modify the second local model such that they are consistent with the central model.

2. The method of claim 1, further comprising accessing one or more operational transformations stored in computer-readable memory, each transformation specifying how one primitive operation is transformed against another primitive operation, wherein comparing the set of first changes to the set of second changes is performed based on the one or more operational transformations.

3. The method of claim 1, wherein the conflicting operation corresponds to an exclusive operational transformation, in which an operation of a change in the set of first changes conflicts with an operation of a change in the set of second changes.

4. The method of claim 1, wherein reconciling one or more changes in the subset of first changes based on removal of the conflicting operation to provide a reconciled subset of first changes comprises:
   accessing one or more operational transformations stored in computer-readable memory, each transformation specifying how one primitive operation is transformed against another primitive operation; and
   transforming the one or more changes in the subset of first changes based on the one or more operational transformations to account for absence of the conflicting operation.

5. The method of claim 1, wherein defining an updated central model further comprises applying one or more changes of the set of second changes.

6. The method of claim 1, wherein the set of second changes is generated at a first time and the set of first changes is generated as a second time, the second time being later than the first time.

7. The method of claim 1, wherein applying the first set of one or more inverse operations comprises:
   accessing an execution log comprising a sequence of operational transformations that have been applied to the central model;
   determining a reverse sequence based on the sequence; and
   applying one or more inverse operations in the reverse sequence.

8. The method of claim 1, wherein each change in the subset of first changes is affected by the conflicting operation.

9. The method of claim 1, wherein the set of first changes comprises a change.

10. The method of claim 1, wherein the set of first changes comprising a plurality of changes.

11. The method of claim 1, wherein the set of second changes comprises a change.

12. The method of claim 1, wherein the set of second changes comprising a plurality of changes.

13. The method of claim 1, wherein the second user input is generated at a remote computing device and is transmitted to the computing device over a network.

14. The method of claim 1, wherein the first user input is provided by a first user and the second user input is provided by a second user different from the first user.

15. The method of claim 1, wherein the conflicting operation is a complex operation comprising a plurality of primitive operations.

16. A non-transitory computer-readable storage device coupled to one or more processors and having instructions stored thereon which, when executed by the one or more processors, cause the one or more processors to perform operations for maintaining consistency of a data structure, the operations comprising:
   retrieving, at a computing device, the data structure from computer-readable memory, the data structure comprising a central model provided as a tuple that comprises a plurality of objects, a function that maps objects of the plurality of objects and attribute names to value assignments, and references between objects;
   receiving, at the computing device, first user input indicating a set of first changes that have been applied to a first local model and that are to be applied to the central model, each change in the set of first changes comprising one or more primitive operations, each primitive operation being executable to modify the central model;

applying changes of the set of first changes to the central model to provide a first modified central model;

receiving, at the computing device, second user input indicating a set of second changes that have been applied to a second local model and that are to be applied to the central model, each change in the set of second changes comprising one or more primitive operations, each primitive operation being executable to modify the central model;

comparing the set of first changes to the set of second changes to identify a conflicting operation;

applying a first set of one or more inverse operations to the first modified central model to provide a second modified central model, the one or more inverse operations corresponding to the conflicting operation and to one or more changes occurring after the conflicting operation;

removing the conflicting operation from the set of first changes;

defining a subset of first changes, the subset of first changes comprising the one or more changes occurring after the conflicting operation;

reconciling one or more changes in the subset of first changes based on removal of the conflicting operation to provide a reconciled subset of first changes;

defining an updated central model by applying changes of the reconciled subset of first changes to the second modified central model;

storing the central updated model in computer-readable memory; and transmitting the first set of one or more inverse operations and the reconciled subset of first changes to modify the first local model and a second set of one or more inverse operations and a reconciled subset of second changes to modify the second local model such that they are consistent with the central model.

17. A system, comprising:

a computing device; and a computer-readable storage device coupled to the computing device and having instructions stored thereon which, when executed by the computing device, cause the computing device to perform operations for maintaining consistency of a data structure, the operations comprising:

retrieving, at a computing device, the data structure from computer-readable memory, the data structure comprising a central model provided as a tuple that comprises a plurality of objects, a function that maps objects of the plurality of objects and attribute names to value assignments, and references between objects;

receiving, at the computing device, first user input indicating a set of first changes that have been applied to a first local model and that are to be applied to the central model, each change in the set of first changes comprising one or more primitive operations, each primitive operation being executable to modify the central model;

applying changes of the set of first changes to the central model to provide a first modified central model;

receiving, at the computing device, second user input indicating a set of second changes that have been applied to a second local model and that are to be applied to the central model, each change in the set of second changes comprising one or more primitive operations, each primitive operation being executable to modify the central model;

comparing the set of first changes to the set of second changes to identify a conflicting operation;

applying a first set of one or more inverse operations to the first modified central model to provide a second modified central model, the one or more inverse operations corresponding to the conflicting operation and to one or more changes occurring after the conflicting operation;

removing the conflicting operation from the set of first changes;

defining a subset of first changes, the subset of first changes comprising the one or more changes occurring after the conflicting operation;

reconciling one or more changes in the subset of first changes based on removal of the conflicting operation to provide a reconciled subset of first changes;

defining an updated central model by applying changes of the reconciled subset of first changes to the second modified central model;

storing the central updated model in computer-readable memory; and transmitting the first set of one or more inverse operations and the reconciled subset of first changes to modify the first local model and a second set of one or more inverse operations and a reconciled subset of second changes to modify the second local model such that they are consistent with the central model.

* * * * *